(12) United States Patent
Baudisch

(10) Patent No.: US 7,770,120 B2
(45) Date of Patent: *Aug. 3, 2010

(54) ACCESSING REMOTE SCREEN CONTENT

(75) Inventor: Patrick M. Baudisch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

This patent is subject to a terminal disclaimer.

(21) Appl. No.: 11/690,746

(22) Filed: Mar. 23, 2007

(65) Prior Publication Data

US 2007/0192749 A1   Aug. 16, 2007

Related U.S. Application Data

(63) Continuation of application No. 10/384,869, filed on Mar. 5, 2003, now Pat. No. 7,231,609.

(60) Provisional application No. 60/444,993, filed on Feb. 3, 2003.

(51) Int. Cl.
G06F 3/00 (2006.01)
G06F 3/048 (2006.01)
G06F 3/033 (2006.01)

(52) U.S. Cl. .................. 715/740; 715/779; 715/799; 715/863

(58) Field of Classification Search ........... 715/740, 715/779, 799, 863
See application file for complete search history.

(56) References Cited

U.S. PATENT DOCUMENTS

| 5,298,890 | A | 3/1994 | Kanamaru |
| 5,508,717 | A | 4/1996 | Miller |
| 5,564,004 | A | 10/1996 | Grossman |
| 5,646,647 | A | 7/1997 | Chow |
| 5,786,805 | A | 7/1998 | Barry |
| 5,808,601 | A | 9/1998 | Leah |
| 5,874,962 | A | 2/1999 | de Judicibus |
| 5,880,723 | A | 3/1999 | Driskell |
| 5,917,486 | A | 6/1999 | Rylander |
| 5,933,138 | A | 8/1999 | Driskell |
| 5,990,862 | A | 11/1999 | Lewis |
| 6,075,531 | A | 6/2000 | DeStefano |

(Continued)

OTHER PUBLICATIONS

Baudisch, P., et al., "Focus Plus Context Screens: Combining Display Technology With Visualization Techniques," Proceedings of the 14th Annual Association for Computing Machinery Symposium on User Interface Software and Technology (UIST '01), Orlando, Florida, Nov. 11-14, 2001, pp. 31-40.

(Continued)

*Primary Examiner*—William L Bashore
*Assistant Examiner*—David Phantana-angkool
(74) *Attorney, Agent, or Firm*—Lee & Hayes, PLLC

(57) ABSTRACT

A system and method for facilitating user access to remote content from a current location is presented. The method comprises the following steps. An activation gesture is detected. The activation gesture includes a location. At least one base icon on the display screen located at a distance greater than a predetermined distance from the activation gesture's location is selected. A target icon for each selected base icon is generated. The target icons are output for display in proximity to the activation gesture's location until an action dismissing the target icons is detected.

17 Claims, 24 Drawing Sheets

U.S. PATENT DOCUMENTS

| | | | |
|---|---|---|---|
| 6,239,803 | B1 | 5/2001 | Driskell |
| 6,285,374 | B1 | 9/2001 | Falcon |
| 6,545,666 | B1 | 4/2003 | Culler |
| 6,567,070 | B1 | 5/2003 | Light |
| 6,587,131 | B1 | 7/2003 | Nakai |
| 6,801,230 | B2 | 10/2004 | Driskell |
| 6,816,176 | B2 | 11/2004 | Laffey |
| 6,883,143 | B2 | 4/2005 | Driskell |
| 7,546,545 | B2 * | 6/2009 | Garbow et al. ............... 715/769 |
| 7,627,831 | B2 * | 12/2009 | Chiu et al. ................... 715/767 |
| 2006/0168548 | A1 | 7/2006 | Kelley |
| 2008/0077874 | A1 * | 3/2008 | Garbow et al. ............... 715/764 |

OTHER PUBLICATIONS

Beaudouin-Lafon, M., "Instrumental Interaction: An Interaction Model for Designing Post-WIMP User Interfaces," Proceedings of the Association for Computing Machinery's Special Interest Group on Computer-Human Interaction Conference on Human Factors in Computing Systems (CHI '00), The Hague, The Netherlands, Apr. 1-6, 2000, pp. 446-453.

Elrod, S., et al., "Liveboard: A Large Interactive Display Supporting Group Meetings, Presentations, and Remote Collaboration," Proceedings of the Association for Computing Machinery Conference on Human Factors in Computing Systems (CHI '92), Monterey, California, May 3-7, 1992, pp. 599-607.

Fitts, P.M., "The Information Capacity of the Human Motor System in Controlling the Amplitude of Movement," J. Exp. Psychol. 47:381-391, 1954 (reprinted J. Exp. Psychol. 121(3):262-269, 1992).

Geissler, J., "Shuffle, Throw or Take It! Working Efficiently With an Interactive Wall," Proceedings of the Association for Computing Machinery's Special Interest Group on Computer-Human Interaction Conference on Human Factors in Computing Systems (CHI '98 Late-Breaking Results), Los Angeles, California, Apr. 18-23, 1998, pp. 265-266.

Guimbretiere, F., et al., "Fluid Interaction With Hi-Resolution Wall-Size Displays," Proceedings of the 14th Annual Association for Computing Machinery Symposium on User Interface Software and Technology (UIST '01), Orlando, Florida, Nov. 11-14, 2001, pp. 21-30.

Rekimoto, J., "Pick-and-Drop: A Direction Manipulation Technique for Multiple Computer Environments," Proceedings of the 10th Annual Association for Computing Machinery Symposium on User Interface Software and Technology (UIST '97), Banff, Canada, Oct. 14-17, 1997, pp. 31-39.

Shneiderman, B., Designing the User Interface: Strategies for Effective Human-Computer Interaction, 3d ed., Addison Wesley Longman, Reading, Massachusetts, 1998.

Wagner, A., et al., "Drag Me, Drop Me, Treat Me Like an Object," Proceedings of the Association for Computing Machinery Conference on Human Factors in Computing Systems (CHI '95), Denver, Colorado, May 7-11, 1995, pp. 525-530.

Zhai, S., et al., "Manual and Gaze Input Cascaded (Magic) Pointing," Proceedings of the Association for Computing Machinery Conference on Human Factors in Computing Systems (CHI '99), Pittsburgh, Pennsylvania, May 15-20, 1999, pp. 246-253.

* cited by examiner

ACCESSING REMOTE SCREEN CONTENT

CROSS-REFERENCES TO RELATED APPLICATIONS

This application is a continuation of U.S. patent application Ser. No. 10/384,869, filed Mar. 5, 2003, which claims the benefit of U.S. Provisional Application No. 60/444,993, filed Feb. 3, 2003, which are hereby incorporated by reference.

BACKGROUND

Accessing remote on-screen content from a current working location has become increasingly important with the emergence of various technologies, including large display devices, multiple display devices cooperatively displaying a single visual display area, pressure-sensitive display devices, and input devices such as pen- and touch-based devices, and other popular, nontraditional input devices. Previously, accessing remote content from a current working location typically involved moving a mouse a relatively short distance. However, with the emergence and convergence of these technologies, there are many times that a user cannot easily move a mouse, or manipulate another input device, to access the remote content. This is especially true when combining the movement of a cursor with a click-and-drag operation, typically requiring that a mouse button remain depressed for the entire movement operation. The following examples illustrate just a few of the scenarios where accessing remote content becomes a challenge.

Tablet devices are typically pen-based devices, where the display screen doubles as the input device. To select and drag an item on a tablet device, a user taps on the item, such as an icon, and, while maintaining pressure on the display device with the pen, drags the item to the desired location. Tablet devices typically have modestly sized display screens, but may be connected with an external display device to expand the display area, creating a single visual display area over multiple devices. This combination creates a single visual display area encompassing both the tablet's display screen and the external display screen. However, while the tablet's display is pen sensitive, the external display device typically is not. Thus, using a pen to click and drag an item from a working location on the tablet's pen-sensitive display to a remote location on the external display device cannot be easily accomplished.

Multiple touch-sensitive display devices similarly necessitate awkward user interactions to cross the physical boundaries of the display devices in order to navigate to a remote location. For instance, to drag an icon across the physical boundaries of multiple display devices requires numerous user manipulations, depending on the number of borders to cross. For example, using pen-based display devices, a user must drag the icon to a physical border and place it at least partially on the border. The user then must pick up the icon on the adjacent display device to continue its movement.

Alternative input devices, such as touchpads commonly found on notebook computers, are relatively small in relation to the notebook's display size. Due to the relatively small area of the touchpad, dragging an icon from a working area to a remote location on the screen typically requires the user to perform multiple drag operations to span the distance between the locations.

In addition to the above examples, computer systems with just one large display device, such as a wall-sized display device, and using a typical input device, such as a mouse, present difficulties in accessing remote content. As an icon is dragged from a working location to a remote area, the opportunities to accidentally drop the icon before reaching the targeted remote destination increase with the distance traveled, especially when the user must reposition the mouse on a mouse pad, or within the available movement space to continue its movement.

Several solutions for solving the problems related to accessing remote on-screen content have been proposed. One solution is to provide hardware that tracks the motion of the eye. While the eye is able to travel great distances and traverse physical boundaries, this solution requires additional, expensive hardware not readily available.

Another solution, not requiring specialized hardware, employs a technique involving "throwing" gestures. Using this technique, a user is able to accelerate an object, such as an icon, with a small "throwing" gesture. Once thrown, the object then continues its trajectory based on its inertia to a receptive target location, such as another icon. Unfortunately, the imprecision of human motor skills prevents this solution from being a reliable target-acquisition system. Difficulties also arise when there are multiple receptive targets along a trajectory path, in particular, determining which of the potential targets is the correct target.

Yet another solution involves predicting actions a user is likely to perform based on previous interactions or according to established rules. On-screen icons associated with those actions likely to be next performed by a user are relocated near the cursor and constantly track the cursor, relocating with the cursor, so that those icons are always close to the cursor. The predicted actions are updated based on the user's continued interaction. Unfortunately, constantly tracking the cursor and relocating icons in response to cursor movements creates an ever-changing screen display. Organizing icons on a screen becomes nearly impossible as icons continually relocate according to cursor movements and predicted subsequent actions. Additionally, deviating from the predicted user interactions to remote content requires the user to navigate through a maze of predicted content.

As described in the previous examples, most current solutions for accessing remote content from a current working location involve moving from the current location to the remote content area. Additionally, most prior art solutions require the user to change working areas, rather than the remote content accommodating the user at the current working area. Those that do not create organizational problems for screen content and are not easily adaptable to a one-time deviation from a predicted pattern. While moving to the remote content location may be possible using indirect input devices, such as a mouse, it is very difficult or not possible when the user is limited to direct input devices, such as a pen on a pressure-sensitive display. What is needed is a system and method for accessing remote content by temporarily displaying remote content in the proximity of the working area. Additionally, the system and method should temporarily display the remote content in the proximity of the working area only in response to a user's gesture indicating that the remote content should be temporarily relocated.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one embodiment of the claimed subject matter, a method for facilitating user access to remote content from a current location is presented. The method comprises the following steps. An activation gesture is detected. The activation gesture includes a location. At least one base icon on the display screen located at a distance greater than a predetermined distance from the activation gesture's location is selected. A target icon for each selected base icon is generated. The target icons are output for display in proximity to the activation gesture's location until an action dismissing the target icons is detected.

According to additional aspects of the claimed subject matter, a method for accessing remotely located icons on a display screen is presented. The method comprises the following steps. An activation gesture is detected. The activation gesture includes a location. At least one base icon remotely located on the display screen is then selected. A target icon is generated for each selected base icon. Thereafter, the target icons are displayed in proximity to the activation gesture's location simultaneously with the selected at least one base icon until an action dismissing the target icons is detected.

According to still further aspects of the claimed subject matter, a computer system for facilitating user access to remote icons on a display device is presented. The computer system comprises a display device capable of displaying a plurality of icons thereon. The computer system further comprises a user input device for interfacing with and interacting with the user, and a computing device, communicatively coupled to the display device and to the user input device. The computer system is configured to output a plurality of icons for display on the display device. The computer system is also configured to detect an activation gesture. The activation gesture includes a location. Upon detecting the activation gesture, the computer system is configured to select at least one base icon on the display screen that is located at a distance greater than a predetermined distance from the activation gesture's location. Thereafter, the computer system is configured to generate a target icon for each selected base icon, and output the target icons in proximity to the activation gesture's location to the display device until an action dismissing the target icons is detected.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
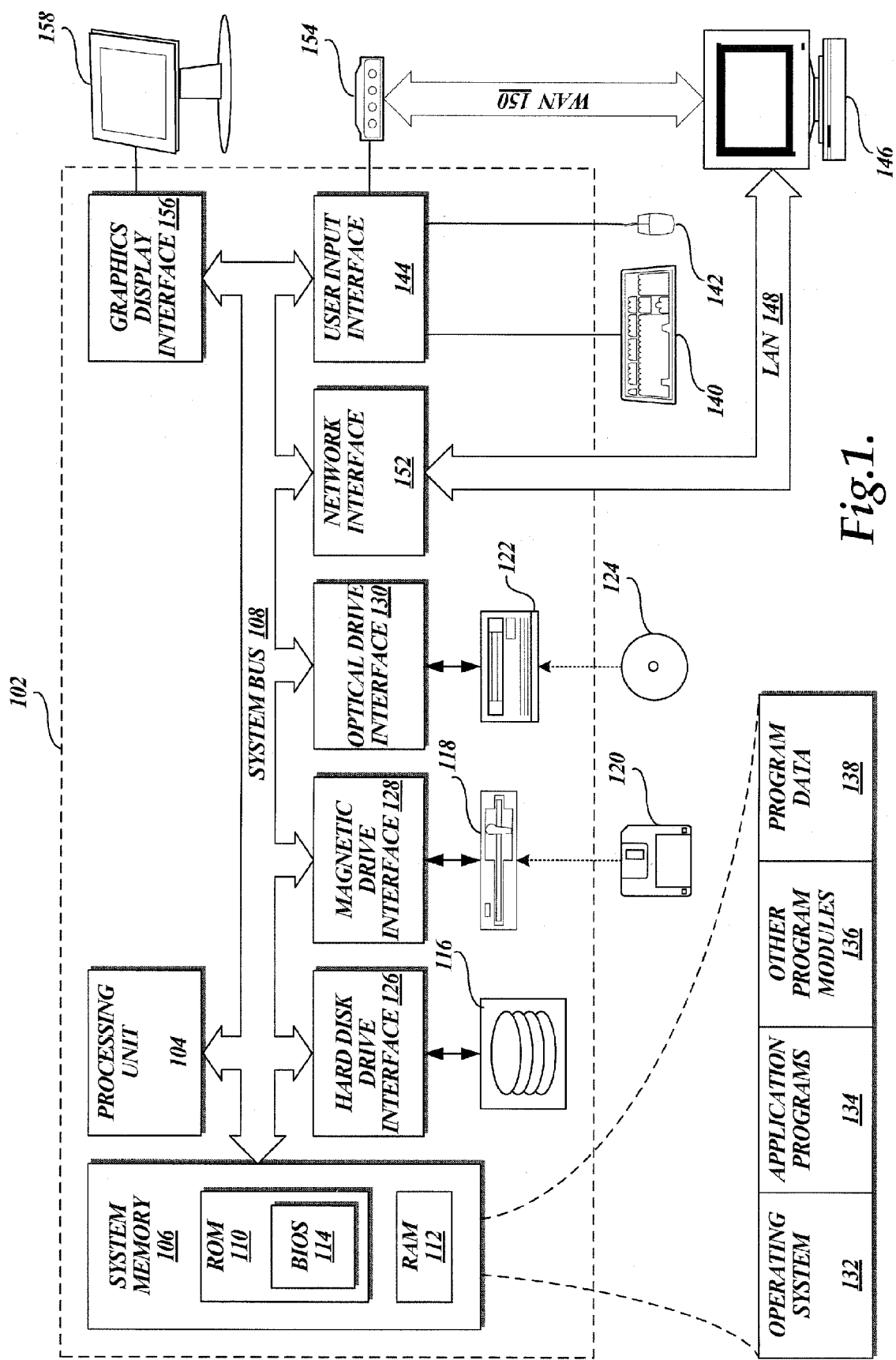
FIG. 1 is a block diagram of an exemplary computer system suitable for implementing the present invention.

FIG. 1 and the following discussion are intended to provide a brief, general description of a computing system suitable for implementing various features of the invention. While the computing system will be described in the general context of a personal computer usable in a distributed computing environment, where complementary tasks are performed by remote computing devices linked together through a communications network, those skilled in the art will appreciate that the invention may be practiced with many other computer system configurations, including multiprocessor systems, minicomputers, mainframe computers, and the like. The invention may be practiced in a local area network or, alternatively, on a single computer using logical, rather than physically remote, devices. Additionally, while the present invention is described in connection with a computer system, it should be understood that the invention may be used in connection with other media stream players such as VCR or DVD players with appropriate control system modifications.

While aspects of the invention may be described in terms of application programs that run on an operating system in conjunction with a personal computer, those skilled in the art will recognize that those aspects also may be implemented in combination with other program modules. Generally, program modules include routines, programs, components, data structures, etc., that perform particular tasks or implement particular abstract data types.

With reference to FIG. 1, an exemplary system for implementing the invention includes a conventional personal computer 102, including a processing unit 104, a system memory 106, and a system bus 108, that couples the system memory to the processing unit 104. The system memory 106 includes read-only memory (ROM) 110 and random-access memory (RAM) 112. A basic input/output system 114 (BIOS), containing the basic routines that help to transfer information between elements within the personal computer 102, such as during startup, is stored in ROM 110. The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, ZIP disks, and the like, may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touchpad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB). A display device 158 is also connected to the system bus 108 via a display subsystem that typically includes a graphics display interface 156 and a code module, sometimes referred to as a display driver, to interface with the graphics display interface. While illustrated as a stand-alone device, the display device 158 could be integrated into the housing of the personal computer 102. Furthermore, in other computing systems suitable for implementing the invention, such as a personal digital assistant (PDA), the display could be overlaid with a touch-screen. Still further, in other computing systems suitable for implementing the invention, the display could be of multiple segments intended to create a single display area. In addition to the elements illustrated in FIG. 1, personal computers also typically include other peripheral output devices (not shown), such as speakers or printers.

The personal computer 102 may operate in a networked environment using logical connections to one or more remote computers, such as a remote computer 146. The remote computer 146 may be a server, a router, a peer device, or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, intranets, and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communications link between the computers may be used. In addition, the LAN 148 and WAN 150 may be used as a source of nonvolatile storage for the system.

Figure 2:
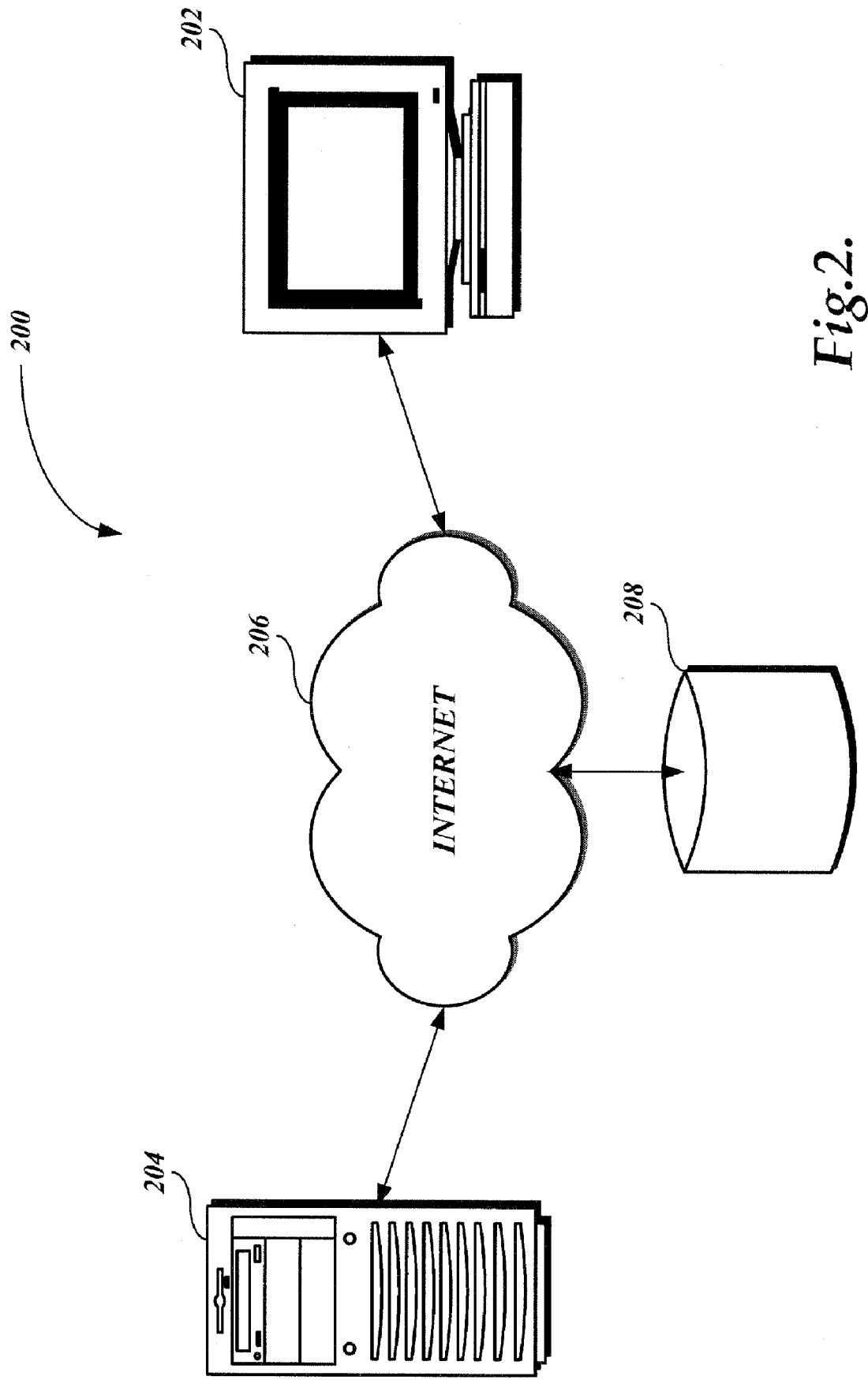
FIG. 2 is a block diagram of an exemplary networked computer environment suitable for implementing the present invention.

FIG. 2 is a block diagram of an exemplary networked computer environment 200 suitable for operating the present invention. The exemplary networked computer environment 200 includes a computing device 202 for interacting with a user, and upon which the user may access remote on-screen content, such as the personal computer illustrated in FIG. 1 as described above. It should be understood that the computing device 202 includes many types of physical devices including, but not limited to, personal computers; mini- and mainframe computers; PDAs; tablet computers; interactive display boards; and other devices capable of interacting with a user and displaying content on a display device.

According to aspects of the present invention, the exemplary networked computing environment 200 may include one or more remote servers, such as server 204, to which the computing device 202 may be connected via a communications network, such as the Internet 206. In addition, the computing device 202 may also be connected to other information sources, such as a remote database 208. Icons displayed on the computing device 202 may represent content residing on the remote server 204 or, alternatively, in the remote database 208. Those skilled in the art will recognize that the on-screen content displayed on the computing device 202 may represent other content and devices (not shown) found both locally to the computing device and remotely over a communications network. The content and devices may include printers, fax machines, executable program files, network storage devices, scanners, networks and subnetworks, and the like. Accordingly, the present invention should not be construed as limited to only those items described.

Figure 3A:
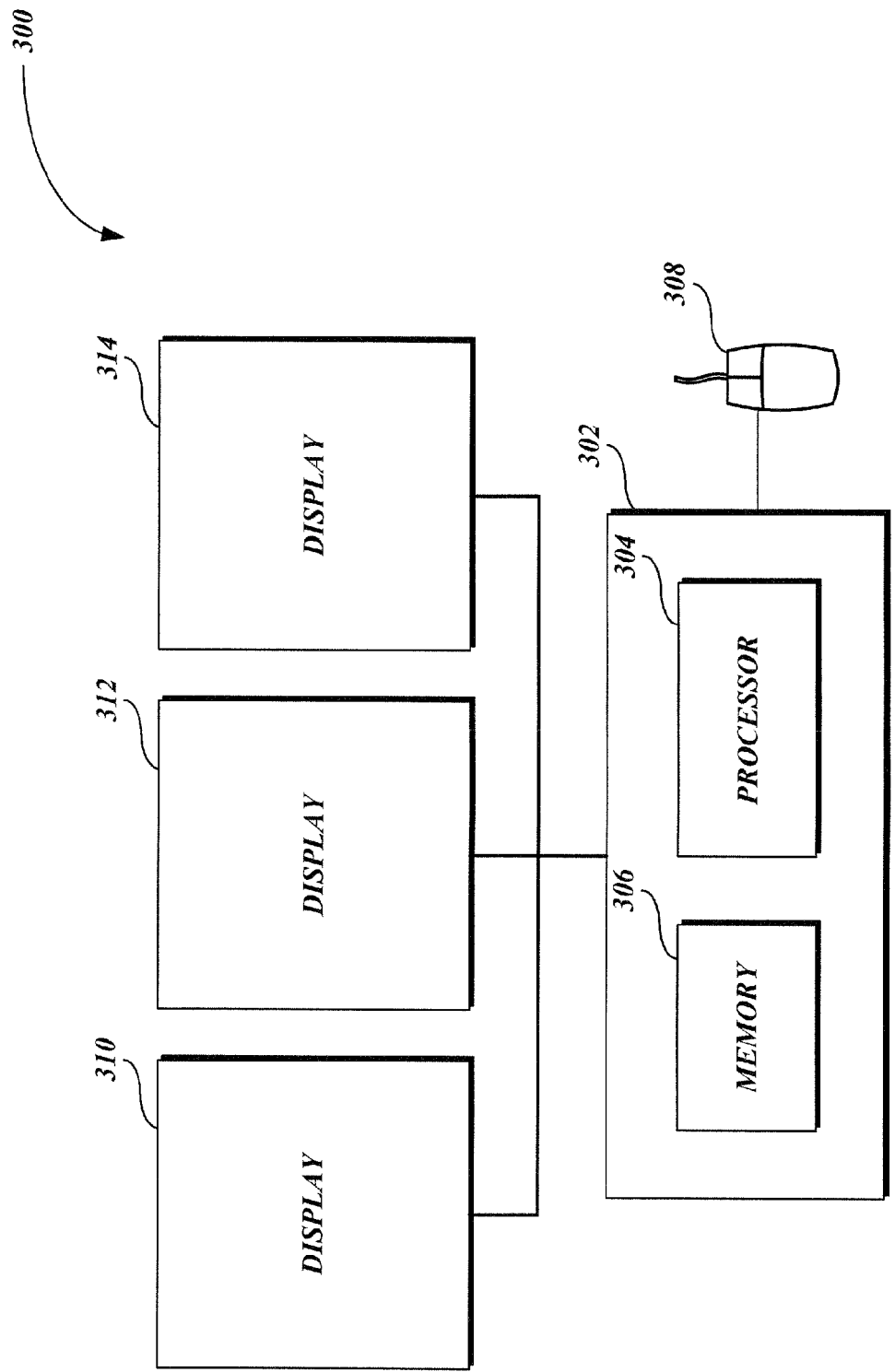
FIGS. 3A and 3B are block diagrams of an alternative exemplary computer system suitable for implementing the present invention.

FIG. 3A is a block diagram of an alternative exemplary computer system 300 suitable for operating the present invention. As shown in the exemplary computer system 300, the system includes a computing device 302. The computing device 302 includes a processor 304 and a memory 306. Those skilled in the art will appreciate that the computing device 302 will include many additional devices and components not illustrated in the computing system 300 shown in FIG. 3 for illustration purposes.

As shown in FIG. 3A, connected to the computing device 302 is a user input device 308. As previously described, input devices may include a mouse, a touchpad, a pen or stylus, a joystick, and the like. However, these examples are described for illustrative purposes only and are not intended to be construed as limiting upon the present invention. Those skilled in the art will recognize that many other user input devices are available, all of which are contemplated as falling within the scope of the present invention.

The computing device 302 of exemplary computer system 300, shown in FIG. 3A, is illustrated as connected to three display devices—display 310, display 312, and display 314. According to aspects of the present invention, display 310, display 312, and display 314 operate together to form a single visual display area. For purposes of this discussion, a visual display area represents the visual area upon which the computing device 302 may display information or content, such as icons. On systems with multiple display devices, the computing device may be configured such that each display device displays a different segment of the single visual display area, thereby cooperatively creating a visual display area as large as the display areas of each individual display device.

Typically, each segment of the visual display area displayed by a display device is adjacent to another. Those skilled in the art will recognize that using multiple display devices to create a visual display area is known in the art. Additionally, the multiple display devices, such as those shown in the exemplary system 300, may be comprised of individual display devices, each having the capacity to operate alone. Alternatively, the multiple display devices may be part of a single device segmented into multiple display panels, where each display panel cannot function as an independent unit. For example, some wall-sized displays are single units, but comprised of multiple display panels.

Figure 3B:
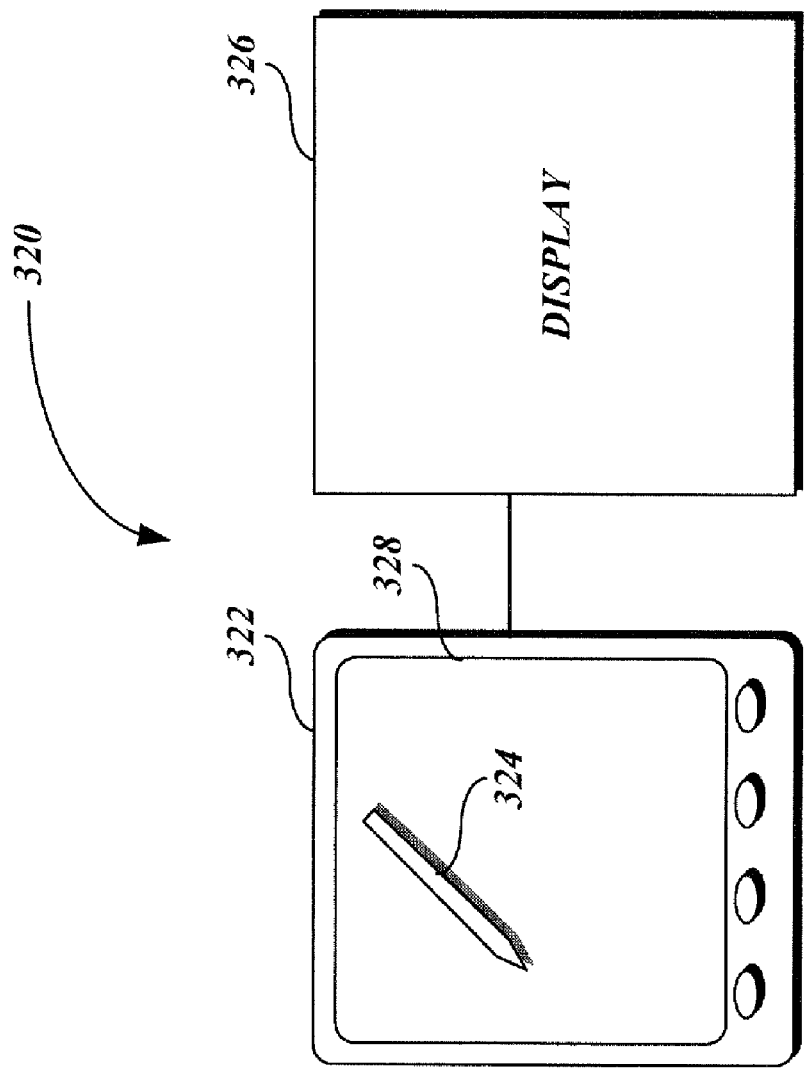

FIG. 3B is a block diagram of another alternative exemplary computer system 320 suitable for operating the present invention. In contrast to the exemplary system 300 of FIG. 3A, the exemplary system 320 of FIG. 3B is illustrative of a tablet computing device 322 connected to an external display device 326. As those skilled in the art will recognize, the tablet computing device 322 includes its own display device 328. Typically, the display device 328 of the tablet computing device 322 is pressure-sensitive. Thus, in addition to being a display device, it is also the input device, in conjunction with a pen 324, to the tablet computing device.

The external display device 326 connected to the tablet computing device 322 operates with the tablet computing device to create a visual display area equal to the size of both the tablet computing device's display device 328 and the external display device 326. According to one aspect of the present invention, multiple display devices connected to a computing device, such as computing device 302 or tablet computing device 322, may be of similar type or size.

While the above discussion describes a system using a tablet computing device, other computing devices may alternatively be used. For example (not shown), a PDA may be used in place of the tablet computing device 322. Those skilled in the art will readily recognize that there are numerous configurations of computing devices and display devices that may benefit from the advantages of the present invention. Accordingly, the above examples and descriptions are presented for illustration purposes, and should not be construed as limiting upon the present invention.

Figure 4:
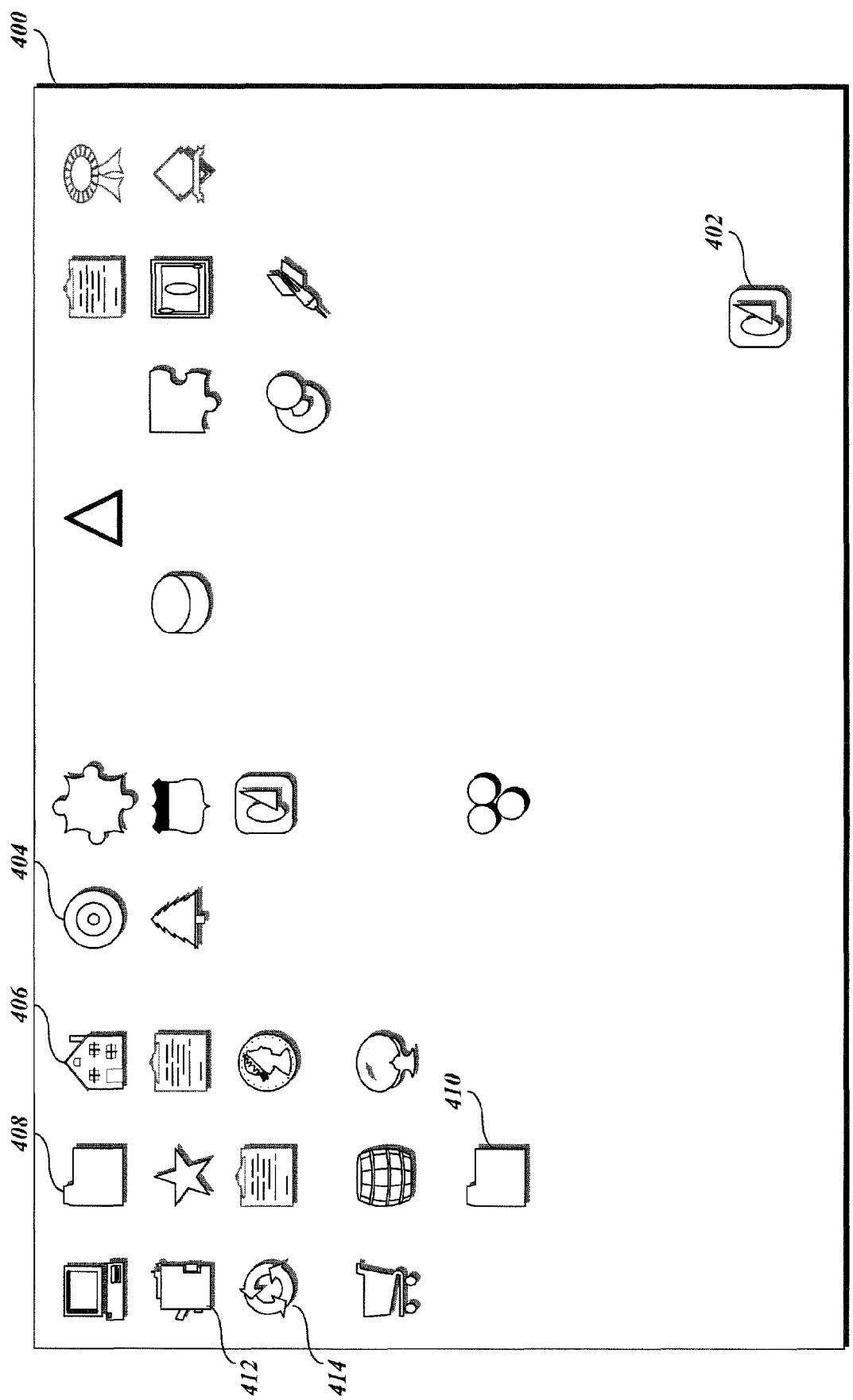
FIG. 4 is a pictorial diagram of an exemplary display screen displaying content for illustrating the operation of the present invention.

FIG. 4 is a pictorial diagram of an exemplary display screen 400 displaying content for illustrating the operation of the present invention. As shown in FIG. 4, the exemplary display screen 400 includes multiple icons representing various types of content and devices, including: data files/documents, such as icon 402 (also frequently referred to as the "source icon" in the discussion that follows); executable programs, such as icon 404 and icon 406; file folders, such as icon 408 and icon 410; printers, such as icon 412; networks; fax devices or services; and recyclers, such as icon 414. The exemplary computer display screen 400 is intended to represent a large amount of screen space and, for purposes of this discussion, all icons on the exemplary display screen, other than the source icon 402, are remote from the source icon.

The exemplary computer display screen 400 may correspond to the display on a single physical display device or, alternatively, may represent a single visual display area displayed on multiple display devices, as described above. Accordingly, while the following discussion of the exemplary computer display screen 400 generally refers to the display screen as displayed on a single display device, this is for ease of illustration purposes only, and should not be construed as limiting the present invention to operating on a single display device.

Figure 5:
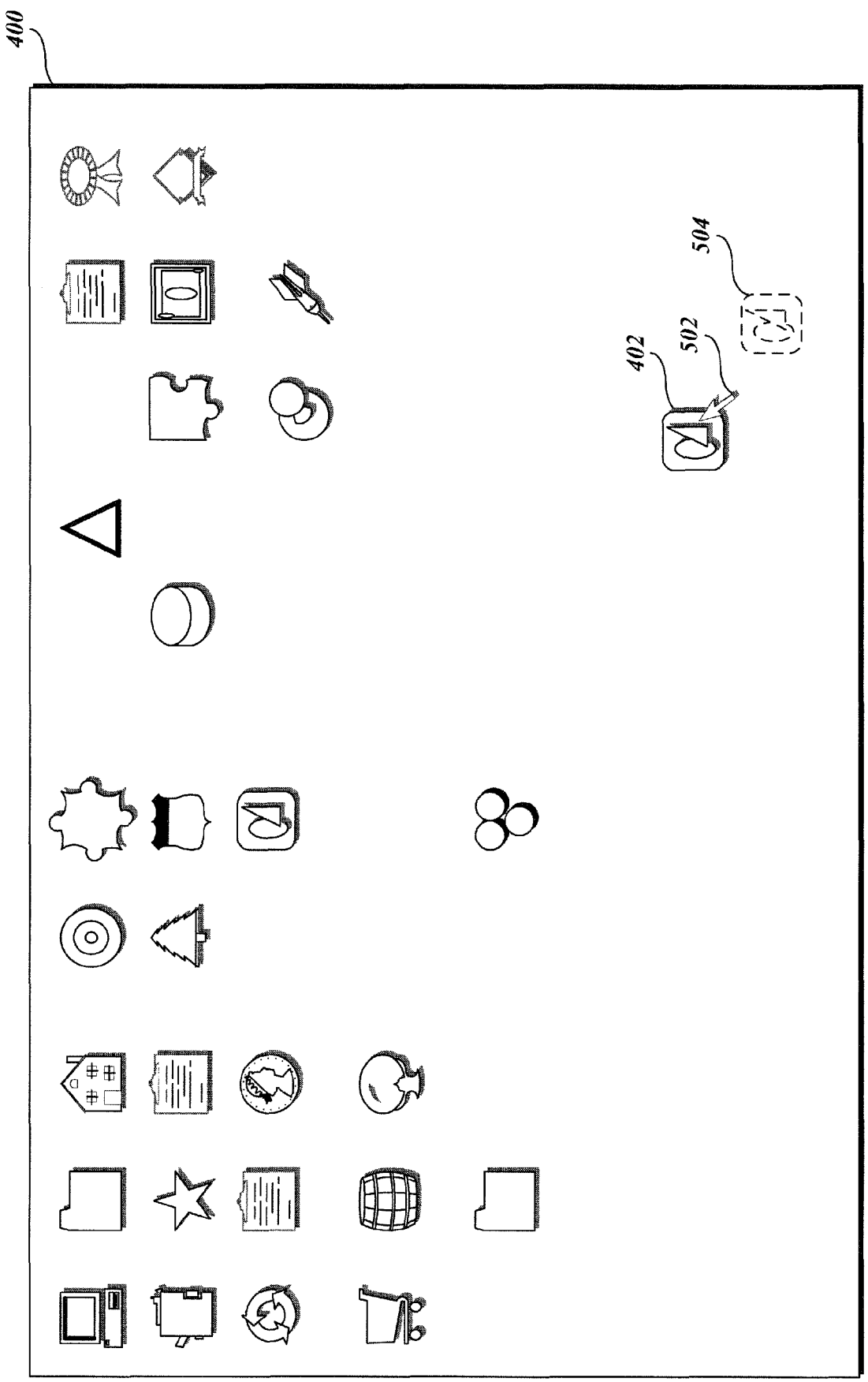
FIG. 5 is a pictorial diagram of the exemplary display screen of FIG. 4 illustrating an activation gesture using a source icon to temporarily display remote content in the proximity of the working area in accordance with the present invention.

FIG. 5 is a pictorial diagram of the exemplary display screen 400 of FIG. 4 illustrating an activation gesture using a source icon 402 to temporarily display remote content in the proximity of the working area. For purposes of this application, the working area, or current working area, refers to the location of the cursor 502, which will usually correspond to the location of the source icon 402.

According to the present invention, in order to cause the system to display the remote content in the proximity of the working area, the user must perform an activation gesture. While the activation gesture may comprise numerous combinations of movements and selections, according to one embodiment of the present invention, the activation gesture is dragging an icon, such as the source icon 402, in a direction for a predetermined distance. According to an alternative embodiment, the activation gesture is dragging on an empty area of the screen in a direction for a predetermined distance. For purposes of the present discussion, dragging an icon creates a nonempty selection, while dragging on an empty area of the screen creates an empty selection. While dragging an icon is well known in the art, as used in the present discussion, dragging entails maintaining the selection while moving from the original location to another location on the display screen. For example, using a mouse as an input device, the user places the cursor over an icon, such as source icon 402, depresses a button located on the mouse, and while holding the button depressed—thereby maintaining the selection—drags the icon to a new location. However, while the above example of dragging an icon is presented using a mouse, it should not be construed as limiting upon the present invention. As is well known to those skilled in the art, there are many other ways of dragging an icon, including, but not limited to, using touchpads, joysticks, pens on pressure-sensitive display screens, etc.

According to aspects of the present invention, the activation gesture may be modified by additional user actions. For example, in order to restrict or modify the type of remote content that is selected in response to a user's activation gesture, the user may modify or supplement the activation gesture by performing an additional action, such as pressing and maintaining pressed a special function key while performing the activation gesture. For instance, a user may press and hold the ALT or CTRL key on a keyboard, or both, while clicking and dragging a source icon. These additional user actions may be associated with predetermined selection operations. For instance, in regard to those activation gestures further modified by pressing the ALT key, a user may restrict the selection of remote content to those items able to print the content associated with a source icon. Any number of other associations may be made according to user preferences. Thus, this illustrative example is for illustration purposes only, and should not be construed as limiting upon the present invention.

According to aspects of the present invention, the predetermined distance may be modified according to user preferences. For example, the predetermined distance may be set to 14 pixels, indicating that the activation gesture (the drag operation) is complete when a source icon has been dragged 14 pixels in a direction. As shown in FIG. 4, the activation gesture is completed by dragging the source icon 402 from its original position 504 in a direction for a distance at least equal to the predetermined distance. Responding to an activation gesture is described further in regard to FIG. 6.

Figure 6:
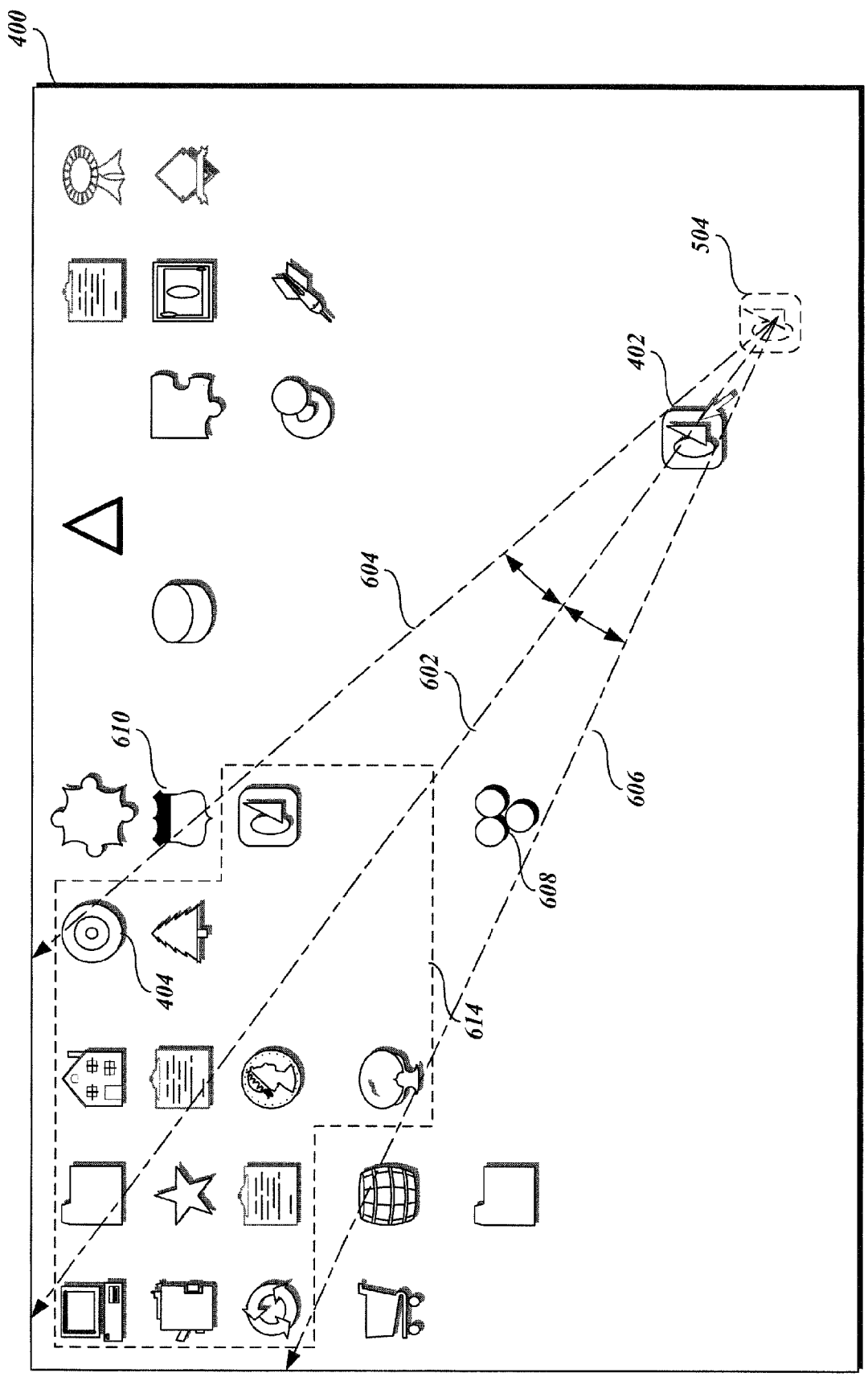
FIG. 6 is a pictorial diagram of the exemplary display screen of FIG. 4 illustrating selecting candidate target icons from a target region in accordance with the present invention.

FIG. 6 is a pictorial diagram of the exemplary display screen 400 of FIG. 4 illustrating selecting candidate target icons from a target region in accordance with the present invention. After detecting an activation gesture, such as dragging the source icon 402 from its previous location 502 for a predetermined distance, the present invention makes a determination as to which icons are to be temporarily displayed in proximity to the working area. This determination is based on the direction of the activation gesture. As shown in FIG. 6, the activation gesture's direction is determined based on the original location 504, the origin, and the current location of the source icon 402 and extends from the origin to the edge of the display screen 400. Vector 602 indicates the direction for the activation gesture described.

According to aspects of the invention, those icons located on and surrounding the activation gesture's direction are considered as candidate icons to be displayed in the proximity of the working area. Accordingly, two lines originating at the original location 504 of the source icon, diverging from the vector 602 on either side and extending to the edge of the display screen, are determined, as indicated by lines 604 and 606. According to one aspect of the present invention, the lines diverge from the vector 602 at a predetermined angle. The predetermined angle may be user adjustable, enabling the user to increase or decrease the area of the target region. Alternatively, the lines may extend from the activation gesture's direction in a parabolic manner, thereby including more remote content as the distance from the activation gesture's original location increases. These offset lines, or boundary lines, together with the edges of the display screen, define a target region from which the candidate icons will be selected for display in proximity to the working area. While the above discussion presents illustrative examples for establishing a target region, they are for illustration purposes only, and should not be construed as limiting upon the present invention. Those skilled in the art will recognize that there are many other ways for determining the target region, all of which are contemplated as falling within the scope of the present invention.

To ensure that only remote icons are temporarily displayed proximately to the working area, the target region is modified by excluding the area located within a predetermined distance of the working area. Any icons within the predetermined distance of the working area are excluded as candidate icons. The predetermined distance from the source icon may be user adjustable. For example, as shown in FIG. 6, icon 608, which may otherwise be a candidate icon, is excluded because it resides within the predetermined distance of the source icon 402, i.e., the working area.

As remote icons may be partially located in the target region, a determination is made as to whether an icon partially located in the target region is located sufficiently within the target region to include it as a candidate icon. According to one aspect, if the center of an icon is located within the target region, that icon is included as a candidate icon. As shown in FIG. 6, icons 610 and 404 are partially located in the target region. However, icon 610 is excluded as a candidate icon because its center is outside the target region, while icon 404 is included as a candidate icon because its center lies inside the target region. Polygon 614 identifies those remote icons that are considered target icons in the exemplary display screen 400 using the foregoing exemplary criterion.

In addition to, or as an alternative to, selecting icons from a target region, target icons may be selected according to their ability to respond to the activation gesture's selection. According to one aspect, if the activation gesture's selection includes a source icon 402, target icons may be selected according to their ability to respond to and operate on the content represented by the source icon. For example, if a selected source icon represented an image file, target icons may be selected according to their ability to open and manipulate the type of image represented by the source icon. Additionally, levels of abilities among candidate icons may be used as a further selection criteria for selecting target icons. Still further, if a modifying condition is detected, or if the number of target icons is too great to be displayed in a target cluster, the base level of ability for a target icon to respond to a source icon may be increased to limit the selection. Those skilled in the art will recognize that there are numerous ways of selecting target icons for inclusion in a target cluster. Thus, while the above discussion presents a few alternatives, they are for illustration purposes only, and should not be construed as limiting upon the present invention.

Figure 7:
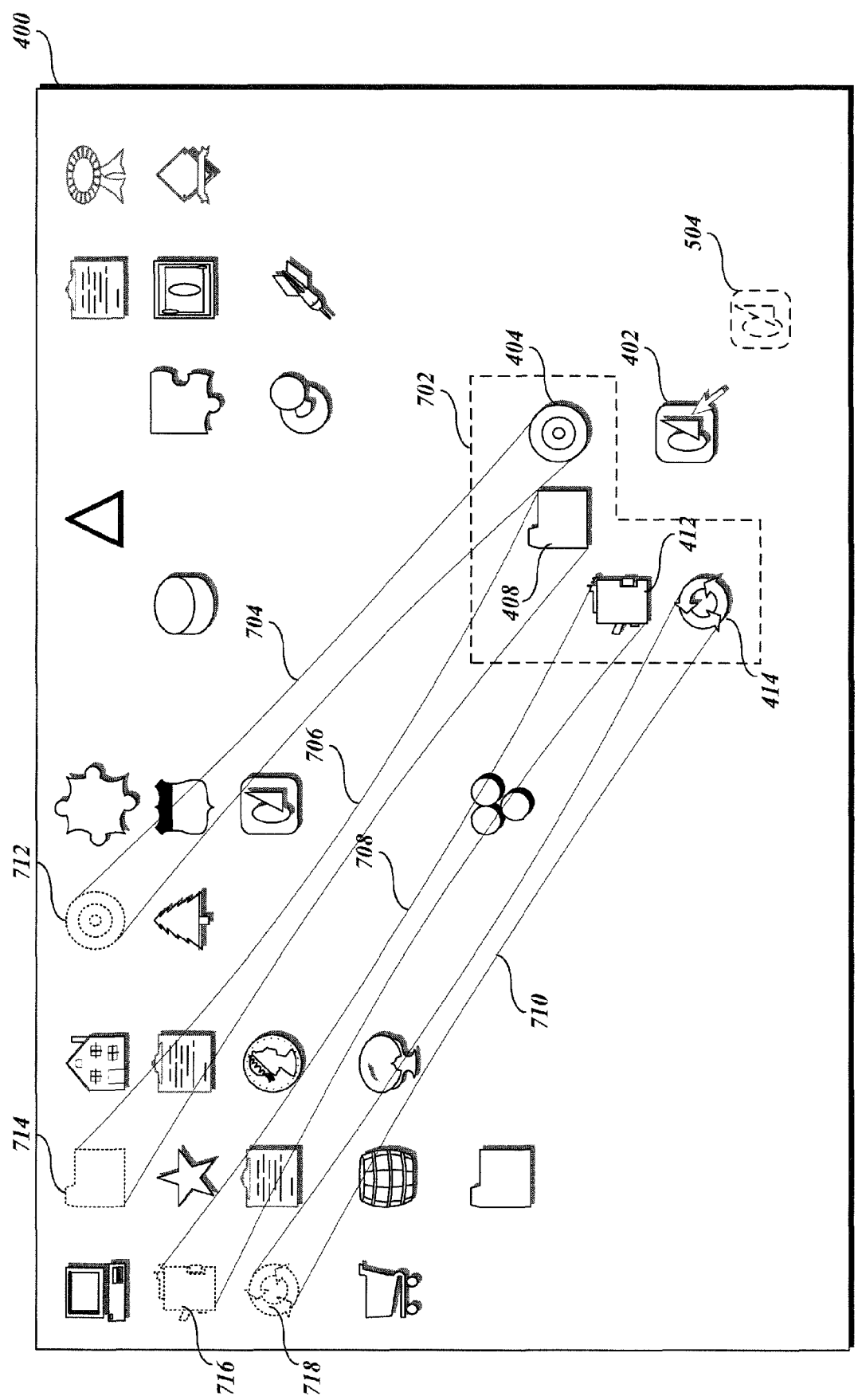
FIG. 7 is a pictorial diagram of the exemplary display screen of FIG. 4 illustrating a temporary target cluster displayed in proximity to the working area in accordance with the present invention.

FIG. 7 is a pictorial diagram of the exemplary display screen 400 of FIG. 4, illustrating a temporary target cluster 702 displayed in proximity to the working area in accordance with the present invention. After determining the target region and the candidate icons, those candidate icons that can respond to the activation gesture's selection are selected to be temporarily displayed in the target cluster 702. More specifically, according to aspects of the invention, if the activation gesture's selection is an empty selection, those icons that represent content that can be executed, i.e., executable files or programs, are selected as target icons to be included in the target cluster. Alternatively, if the activation gesture's selection is a nonempty selection having a source icon, those icons that represent content compatible with the source icon are selected. For example, compatible content may include executable program files associated with the data type associated with the source icon, storage folders, recyclers, printers, fax services, and the like. Determining whether a candidate icon can respond to a source icon's content type is known in the art, consistent with dropping the source icon on another icon. As a further example, if the source icon 402 is a word processing data file, an icon representing a word processor would likely be selected as compatible with the source icon.

Furthermore, as previously discussed, the activation gesture may be modified by an additional user action, such as pressing a special function key during the activation gesture. When such a modification is present, the compatible content is further determined in accordance with an associated criteria. According to yet further aspects of the present invention, selection of the compatible content may be based on a quality measurement. For example, if the activation gesture's selection includes a source icon, that remote content that operates natively with the type of content represented by the source icon may be selected, while that remote content that must convert the content represented by the source icon would not be selected. Thus, the present invention should not be construed as limited to any particular means for determining which remote content to place in the target cluster. In the example shown in FIG. 7, program icon 404, folder icon 408, printer icon 412, and recycler icon 414 are displayed as target icons in the target cluster 702.

The number of target icons, i.e., those icons selected from the candidate icons in the target region and compatible with the activation gesture's selection, is limited by a predetermined maximum amount. The predetermined maximum amount may be user configurable. According to one embodiment, the predetermined maximum amount of target icons in the target cluster is set by default to 5 target icons. When the number of selected target icons exceeds the predetermined maximum amount, the selection criteria of target icons is repeatedly refined until the number of selected target icons no longer exceeds the predetermined maximum amount. Additionally, as described above, the number of target icons selected may be reduced by increasing the quality level, i.e., those that more efficiently operate on a source icon, for selecting candidate icons. A more detailed discussion of selecting target icons and refining the selection of target icons is provided below in regard to FIGS. 16A and 16B.

Those icons that are selected as target icons are temporarily displayed in a target cluster in proximity to the current working area. As shown in FIG. 7, icons 404, 408, 412, and 414 were selected as target icons and displayed in the target cluster 702. Additionally, according to one embodiment of the invention, in order to visually represent to the user the original location of the target icons (referred to hereafter as the base icons), the base icons are grayed or represented in outline form, as shown in FIG. 7 by base icons 712, 714, 716, and 718. Other methods of visually representing a base icon may also be used. Accordingly, while graying or outlining the base icons is described, they are presented for illustration purposes and should not be construed as limiting upon the present invention.

In addition to graying or outlining the base icons, a visual connection, a band, is displayed between a target icon in the target cluster and its corresponding base icon. According to one aspect of the present invention, the band may comprise one or more lines connecting a base icon to its corresponding target icon, as shown in FIG. 7 by bands 704, 706, 708, and 710. Alternatively, a band may be some pattern displayed between a base icon and a corresponding target icon. Other means of representing a band may also be implemented, such as arrows pointing from the base to the target icon, color bands, a single line, and the like. Algorithms for simulating a motion blur between a base icon and a target icon may also be used. Accordingly, the above-described examples are for illustration purposes only, and should not be construed as limiting upon the present invention.

According to still further aspects of the present invention, the band may narrow toward the midpoint between the base and target icons to provide a suggestion that the band is elastic in nature, that the target icon has been stretched from the base icon, and that the target icon will snap back to its base icon when the target cluster is dismissed. Additionally, according to further aspects of the present invention, the amount of narrowing for each band may be a function of the distance between the base icon and its corresponding target icon. For example, while bands 706, 708, and 710 are roughly the same length, band 704 is shorter. Thus, as shown in FIG. 7, band 704 narrows less at its midpoint than the other bands.

As previously mentioned, after selecting the target icons, a target cluster is generated and displayed in proximity to the working area. According to aspects of the invention, preferably, the distance that the target cluster is displayed from the working area is user configurable. For example, a target cluster may be configured to be located 15 pixels from the working area.

According to other aspects of the invention, in generating the target cluster, the arrangement of the target icons in the target cluster may approximate the arrangement of the corresponding base icons on the display screen, as shown in the exemplary display screen 400. A more detailed discussion of generating the target cluster is provided below in regard to FIGS. 17A and 17B.

Figure 8:
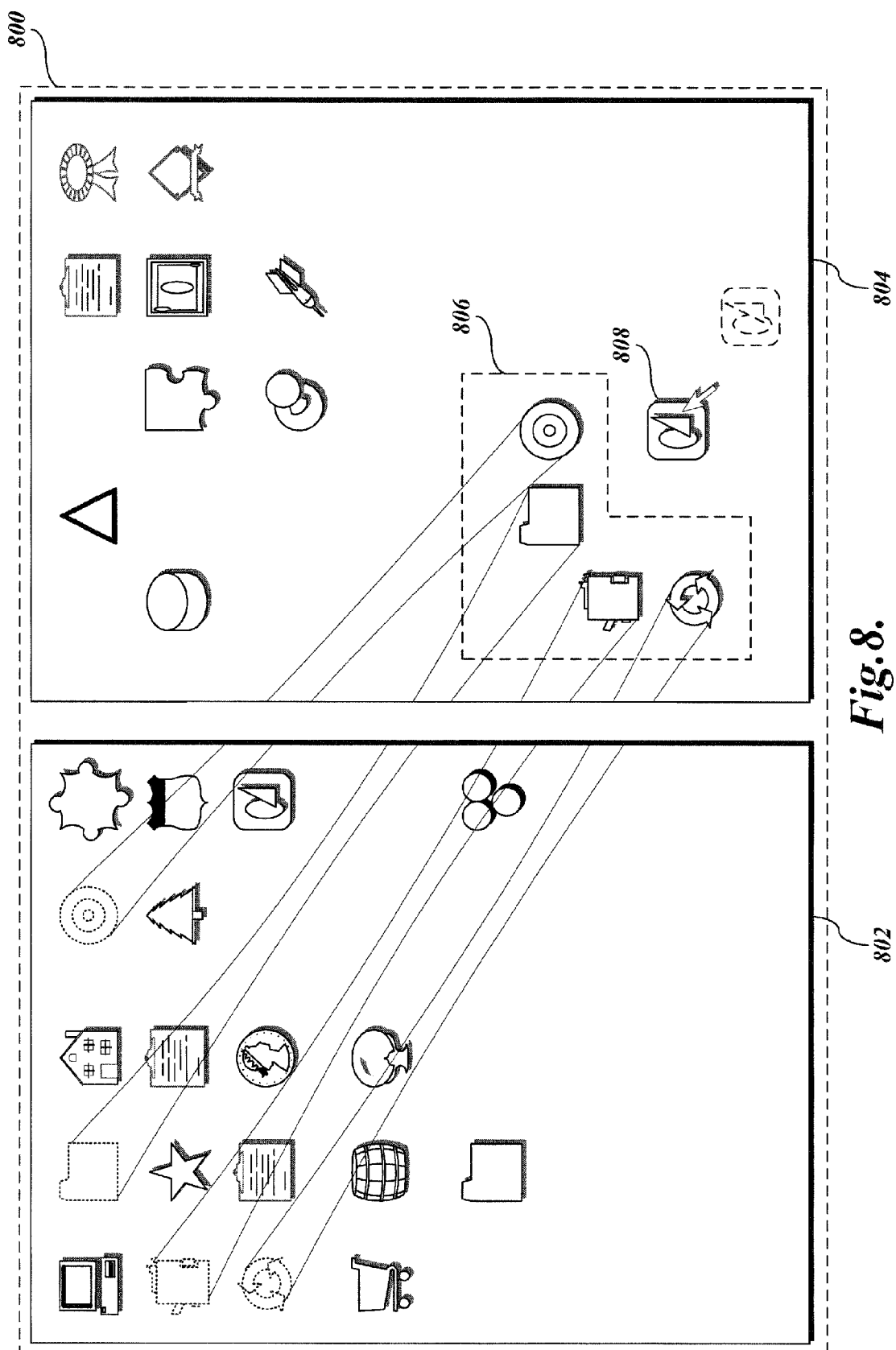
FIG. 8 is a pictorial diagram of an exemplary visual display area formed by two exemplary display devices depicting a temporary target cluster displayed in proximity to a working area associated with a source icon in accordance with the present invention.

As previously mentioned, the present invention may be implemented on a system having multiple physical display devices cooperating to create a single visual display area. Accordingly, FIG. 8 is a pictorial diagram of an exemplary visual display area 800 formed by two exemplary display devices 802 and 804 depicting a temporary target cluster 806 displayed in proximity to a working area, associated with a source icon 808, in accordance with the present invention.

Figure 9:
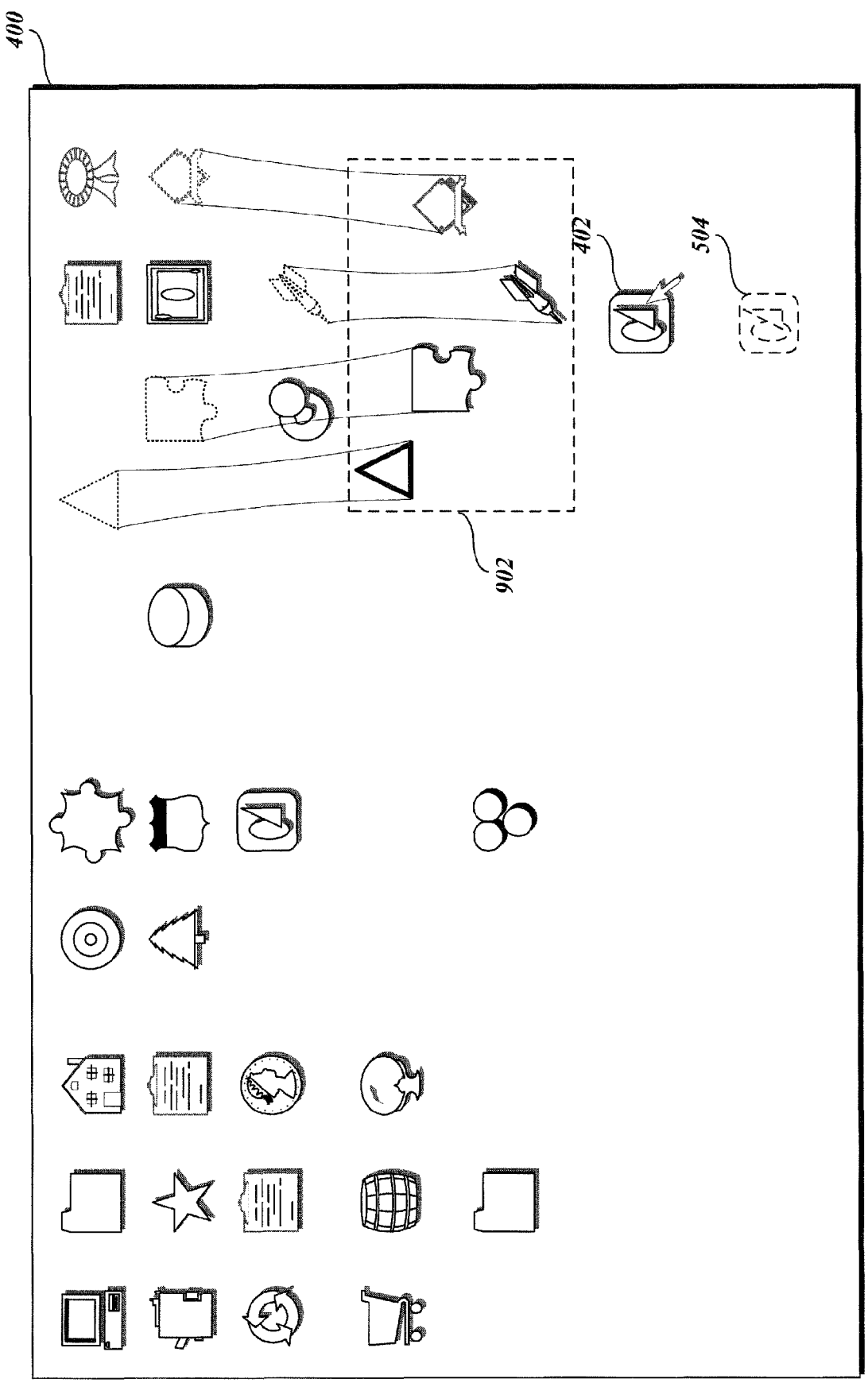
FIG. 9 is a pictorial diagram of the exemplary display screen of FIG. 4 illustrating an alternative temporary target cluster displayed in proximity to the working area in accordance with the present invention.

FIG. 9 is a pictorial diagram of the exemplary display screen 400 of FIG. 4 illustrating an alternative temporary target cluster 902 displayed in proximity to the working area associated with a source icon 402, in accordance with the present invention. As illustrated in FIG. 9, the activation gesture included dragging the source icon 402 from its original location 504 in a near vertical manner for the predetermined distance. As per the description above, a target region was determined, target icons were selected, and the target cluster 902 is generated and displayed in proximity to the working area.

Figure 10:
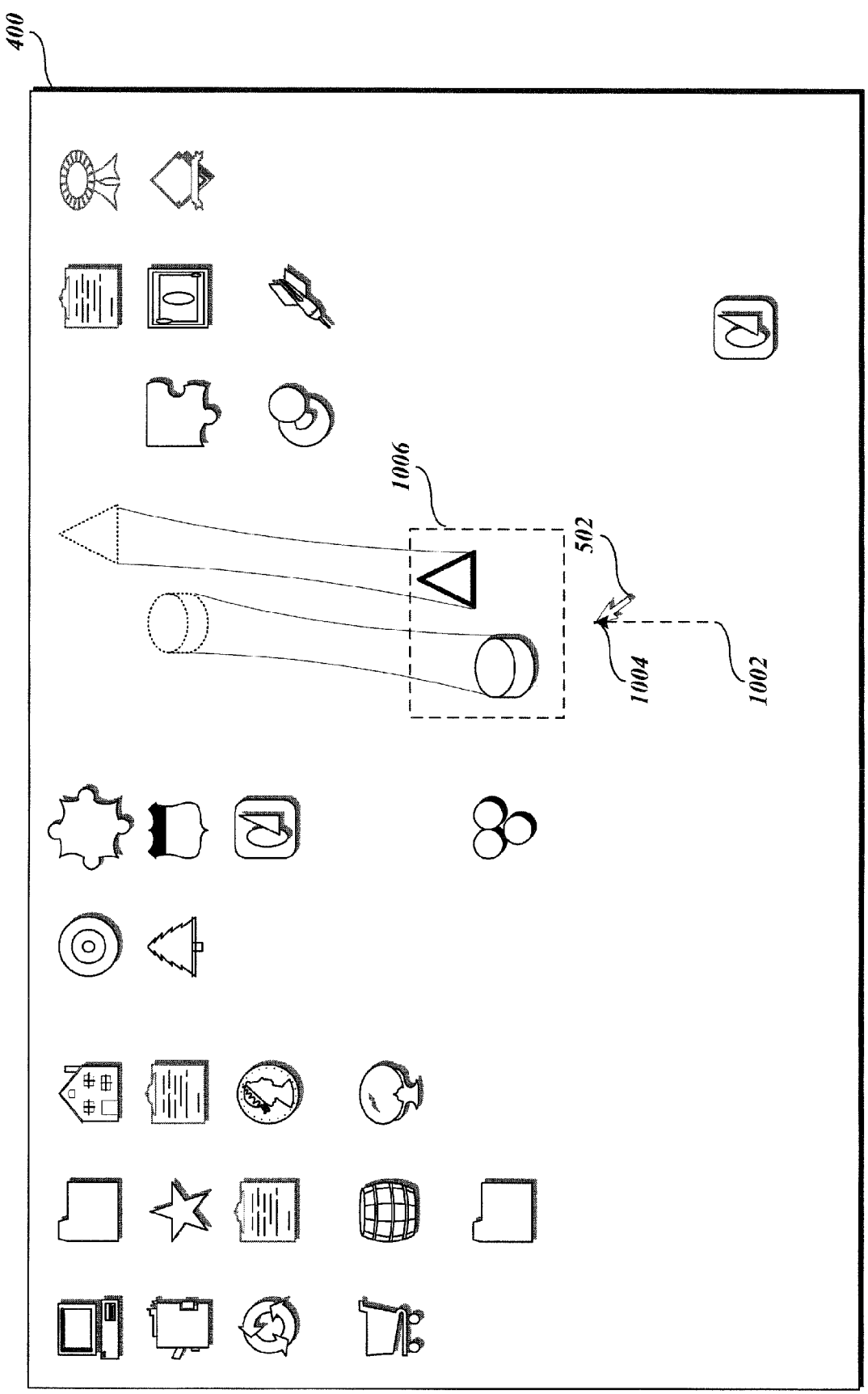
FIG. 10 is a pictorial diagram of the exemplary display screen of FIG. 4 illustrative of an activation gesture with an empty selection and the resulting temporary target cluster displayed in proximity to the working area in accordance with the present invention.

FIG. 10 is a pictorial diagram of the exemplary display screen 400 of FIG. 4 illustrative of an activation gesture with an empty selection and the resulting temporary target cluster 1006 displayed in proximity to the working area 1004 in accordance with the present invention. As previously discussed, an activation gesture does not require that a source icon be dragged. Instead, dragging on an empty area of the display screen for a predetermined distance will cause the present invention to generate and display a temporary target cluster in the proximity of the working area.

Accordingly, as shown in FIG. 10, the activation gesture included dragging an empty selection from the original location 1002 to the working area 1004, and the target cluster 1006 is temporarily displayed in proximity to the working area. As described above, a target region is determined and target icons selected. Because the activation gesture's selection is an empty selection, selection of target icons is not based on which icons represent programs, services, or devices that are compatible with the source icon. Instead, according to one aspect of the invention, the target icons are selected based on their ability to execute. According to an alternative aspect of the invention, all icons located within the target region are selected as target icons because all icons may be somehow manipulated. According to one aspect, all icons may be executable, and are therefore proper candidates as target icons. According to alternative aspects, only icons representing executable programs are proper candidates as target icons. While various ways of selecting target icons for display in the target cluster have been presented, they are for illustration purposes only, and should not be construed as limiting upon the present invention. As shown in FIG. 10, after having selected the target icons, the target cluster 1006 is displayed.

According to aspects of the present invention, the bands between the base and target icons may be displayed in a closest-first order, i.e., displaying bands between the base and target icons beginning with those base icons closest to the working area, to those base icons farthest from the working location. Additionally, the bands may be displayed in a transparent fashion such that information below the bands is at least partially visible, including other bands, base icons, target icons, and other icons.

Figure 11:
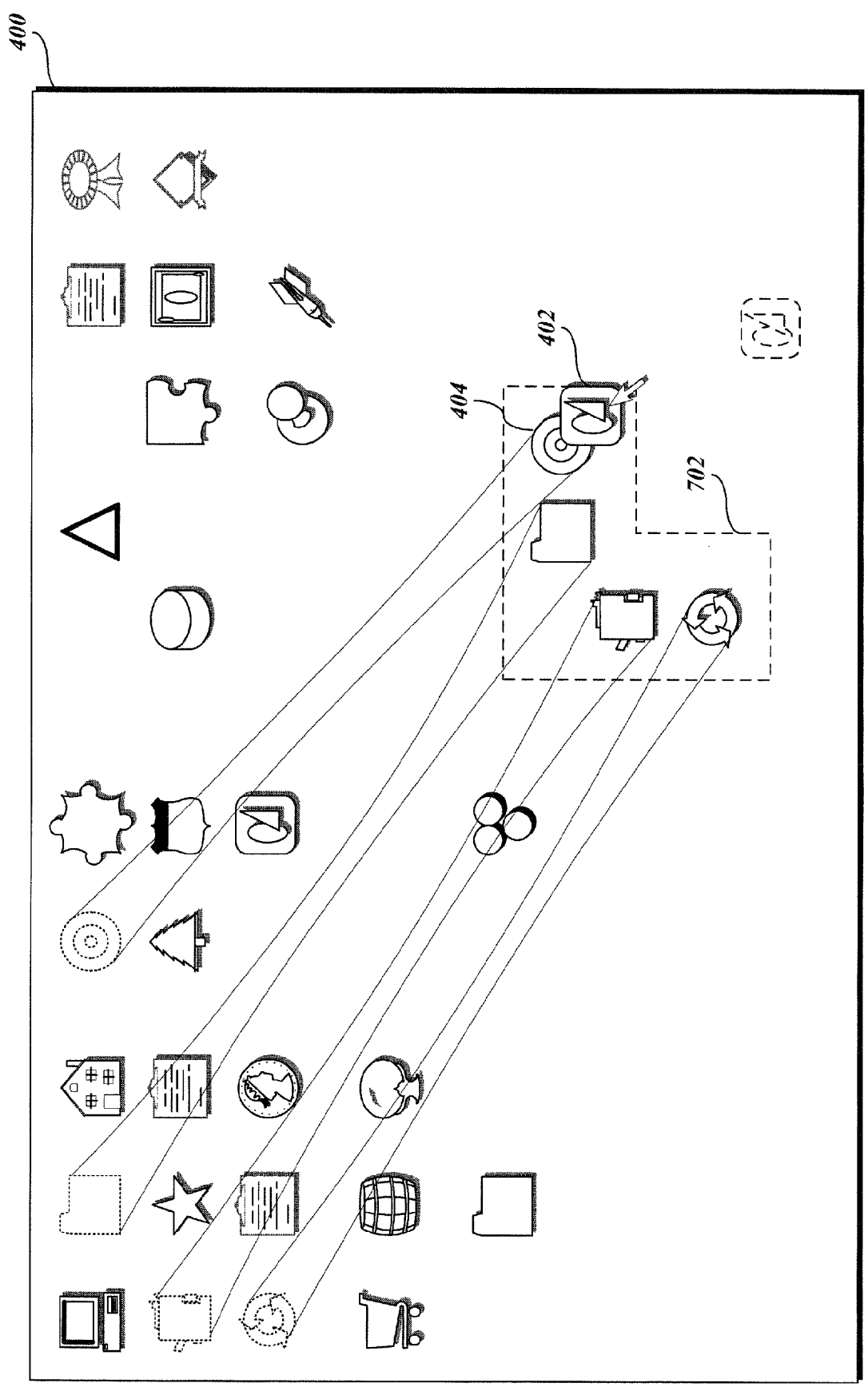
FIG. 11 is a pictorial diagram of the exemplary display screen of FIG. 4 and illustrative of placing the source icon on a target icon in the exemplary temporary target cluster of FIG. 7 to activate that target icon in accordance with the present invention.

FIG. 11 is a pictorial diagram of the exemplary display screen 400 of FIG. 4 and is illustrative of placing the source icon 402 on a target icon 404 in the exemplary temporary target cluster 702 of FIG. 7 to activate that target icon in accordance with the present invention. According to aspects of the invention, releasing the source icon 402 on a target icon 404, as illustrated in FIG. 11, has the same effect as moving to the corresponding base icon and releasing the source icon on the base icon. Thus, if the activation gesture includes a non-empty selection having a source icon 402, and the source icon is released on a target icon 404 representing an executable program, the executable program is launched with the content represented by the source icon as the subject matter. Alternatively (not shown), if the activation gesture's selection is an empty selection, i.e., was made on an empty area of the display screen, dropping on a target icon 404 causes the content represented by the target icon to be launched.

Dropping or releasing the selection is one of the user actions that causes the present invention to dismiss the target cluster 702. Thus, after having executed a program or performed another action associated with a target icon over which the selection is released, or, if the selection is released but not over a target icon, the target cluster 702 is removed from the display screen, as well as the bands that connect the base and target icons. Additionally, the base icons are restored to their original condition if they were modified when the target cluster was displayed.

Figure 12:
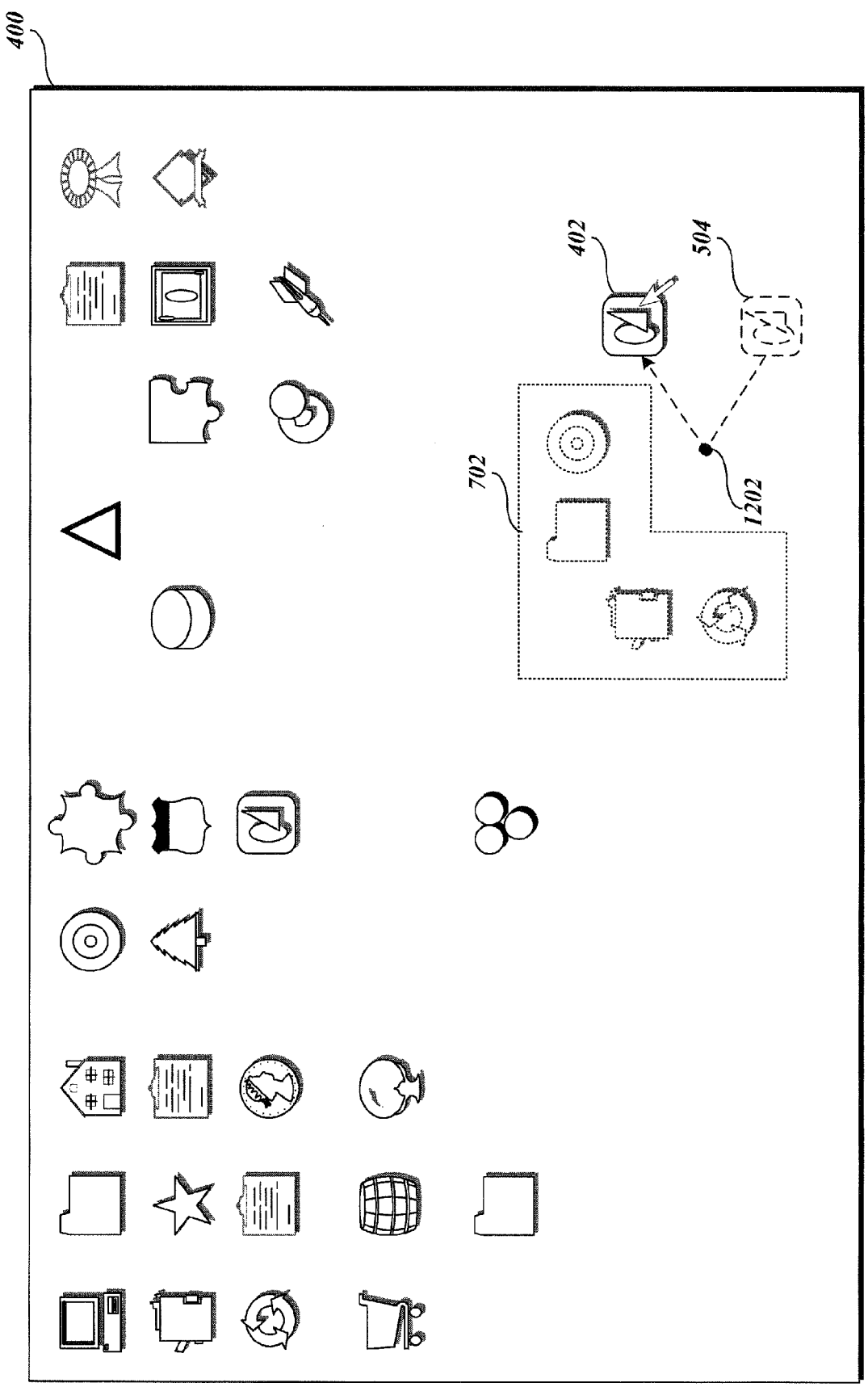
FIG. 12 is a pictorial diagram of the exemplary display screen of FIG. 4 illustrating a user gesture dismissing the temporary target cluster in accordance with the present invention.

Other user actions may also cause the target cluster, bands, and special rendering of the base icons to be removed. FIG. 12 is a pictorial diagram of the exemplary display screen 400 of FIG. 4 illustrating a user action dismissing the target cluster 702 in accordance with the present invention. As shown in FIG. 12, moving the activation gesture's working location, as indicated by cursor 502, in a direction away from any target icon in the target cluster 702 results in the target cluster being removed from the display screen 400, as indicated by the target cluster displayed in dashed lines. Thus, quickly moving in a zigzag manner permits the user to quickly dismiss the target cluster 702.

As shown in FIG. 12, dragging the source icon 402 from the original location 504 to location 1202 initiates the display of the target cluster 702, and moving to the source icon's current location away from all target icons dismisses the target cluster. However, in order to be tolerant of some jerkiness, small user movements away from the target icons in the target cluster 702 are ignored and do not result in the target cluster being dismissed. The amount of movement tolerated by the present invention before dismissing the target cluster may be user configurable. According to further aspects of the present invention, after dismissing a target cluster, preferably, an activation gesture will not be detected until the current activation gesture's selection is released.

According to alternative aspects of the present invention, in order to determine whether the activation gesture's working location has moved away from all target icons in the target cluster, a cluster area is determined according to the outermost target icons in the target cluster, and any movement completely within the target cluster is considered to not be a movement away from all target icons. An exemplary cluster area 1412 is described below in regard to FIG. 14.

While the above discussion describes user actions dismissing the target cluster in terms of moving the working location away from the target cluster, those skilled in the art will recognize that there are numerous other user actions that would be suitable for dismissing the target cluster, such as a key-press or alternate clicking on a mouse. Accordingly, the above description in regard to specific user actions dismissing the target cluster is for illustration purposes only, and should not be construed as limiting upon the present invention.

Figures 13A, 13B:
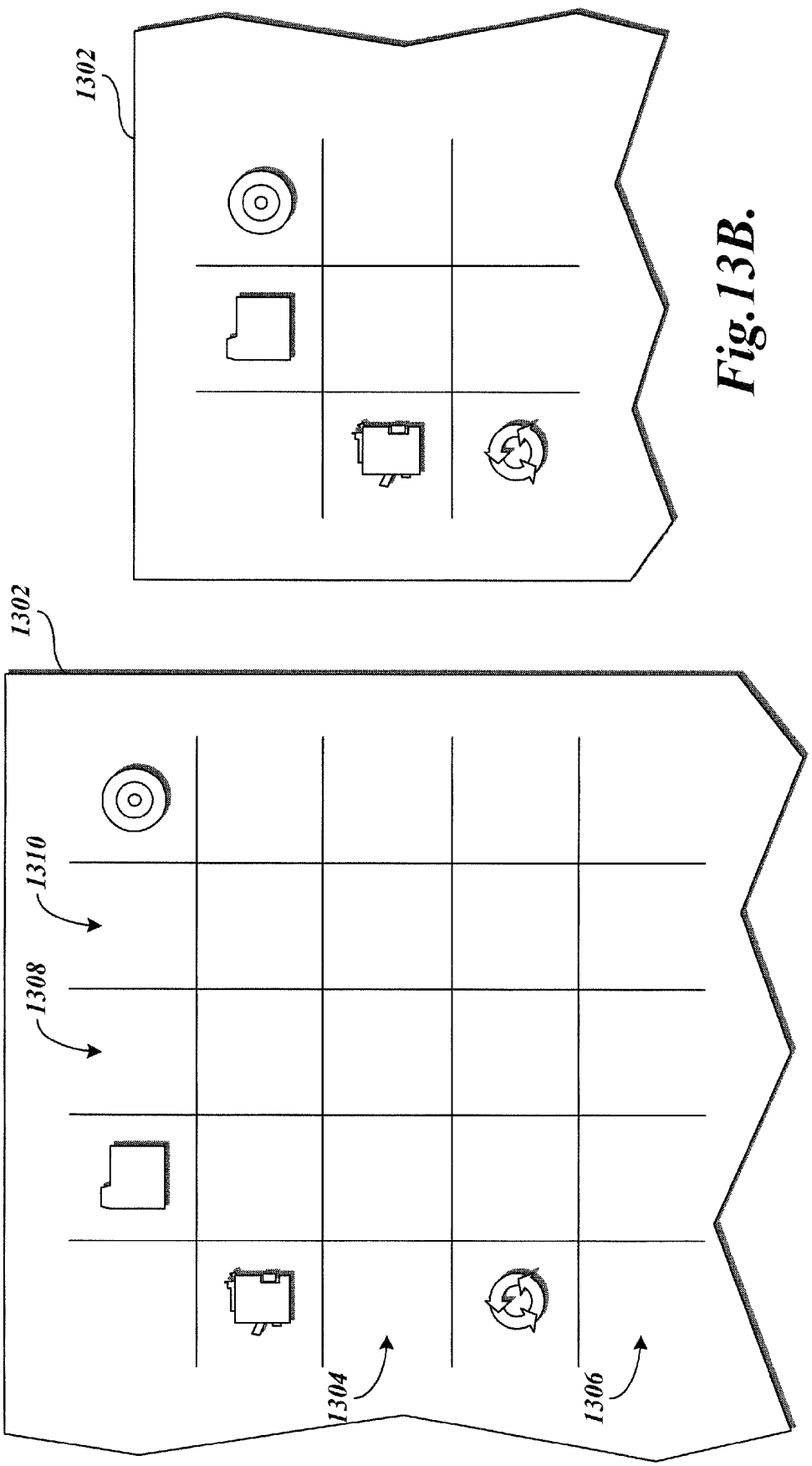
FIG. 13A is a pictorial diagram illustrative of an exemplary two-dimensional grid for organizing and generating a temporary target cluster in accordance with the present invention.
FIG. 13B is a pictorial diagram illustrative of the exemplary two-dimensional grid of FIG. 13A after having been condensed in accordance with the present invention.

FIG. 13A is a pictorial diagram illustrative of an exemplary two-dimensional grid 1302 for organizing and generating a temporary target cluster in accordance with the present invention. After determining a target region, a two-dimensional grid 1302 is generated wherein each cell is capable of mapping to one or more target icons. The cells in the grid correspond to an area of the target region. The actual size of each cell is configurable and begins with predetermined values. The target icons are placed, or mapped, into cells according to their location in the target region. Because target icons located anywhere within the area corresponding to a cell are mapped to that cell, multiple target icons will be mapped to the same cell when those icons are located within the same corresponding cell area. Accordingly, in generating the target cluster, when at least two target icons are mapped to the same cell, the grid is emptied, the area corresponding to each cell reduced, and the mapping of target icons to grid cells is repeated. This action is repeated until no one cell holds, or maps to, more than one target icon. Mapping target icons to grid cells based on the display screen location preserves the general spatial arrangement of the base icons in the target cluster.

When all target icons are mapped to separate grid cells, as shown in FIG. 13A, the spatial arrangement of the grid 1302 may be condensed. Condensing the two-dimensional grid is an optional process that allows the target cluster to be displayed in a compact manner, thereby reducing the amount of travel necessary to access a target icon and also reducing the amount of screen content covered by the target cluster. According to aspects of the present invention, condensing the two-dimensional grid 1302 involves removing rows and columns in the grid that do not contain at least one target icon. For example, rows 1304 and 1306 and columns 1308 and 1310 will be removed from the two-dimensional grid 1302.

FIG. 13B is a pictorial diagram illustrative of the exemplary two-dimensional grid 1302 of FIG. 13A after having been condensed as described above in regard to FIG. 13A. After the two-dimensional grid 1302 is condensed, or if the grid is not to be condensed, a target cluster is created and displayed in proximity to the working area. The positioning of the target icons in the target cluster is the same as that of the cells in the two-dimensional grid in which they are mapped. In effect, the two-dimensional grid is mapped to a location in proximity to the working area.

While the above description illustrates mapping icons to a grid and compressing the grid to generate a target cluster, they are only illustrative, and should not be construed as limiting upon the present invention. Those skilled in the art will recognize that there are numerous ways that a target cluster may generate a target cluster, all of which are contemplated as falling within the scope of the present invention.

Figure 14:
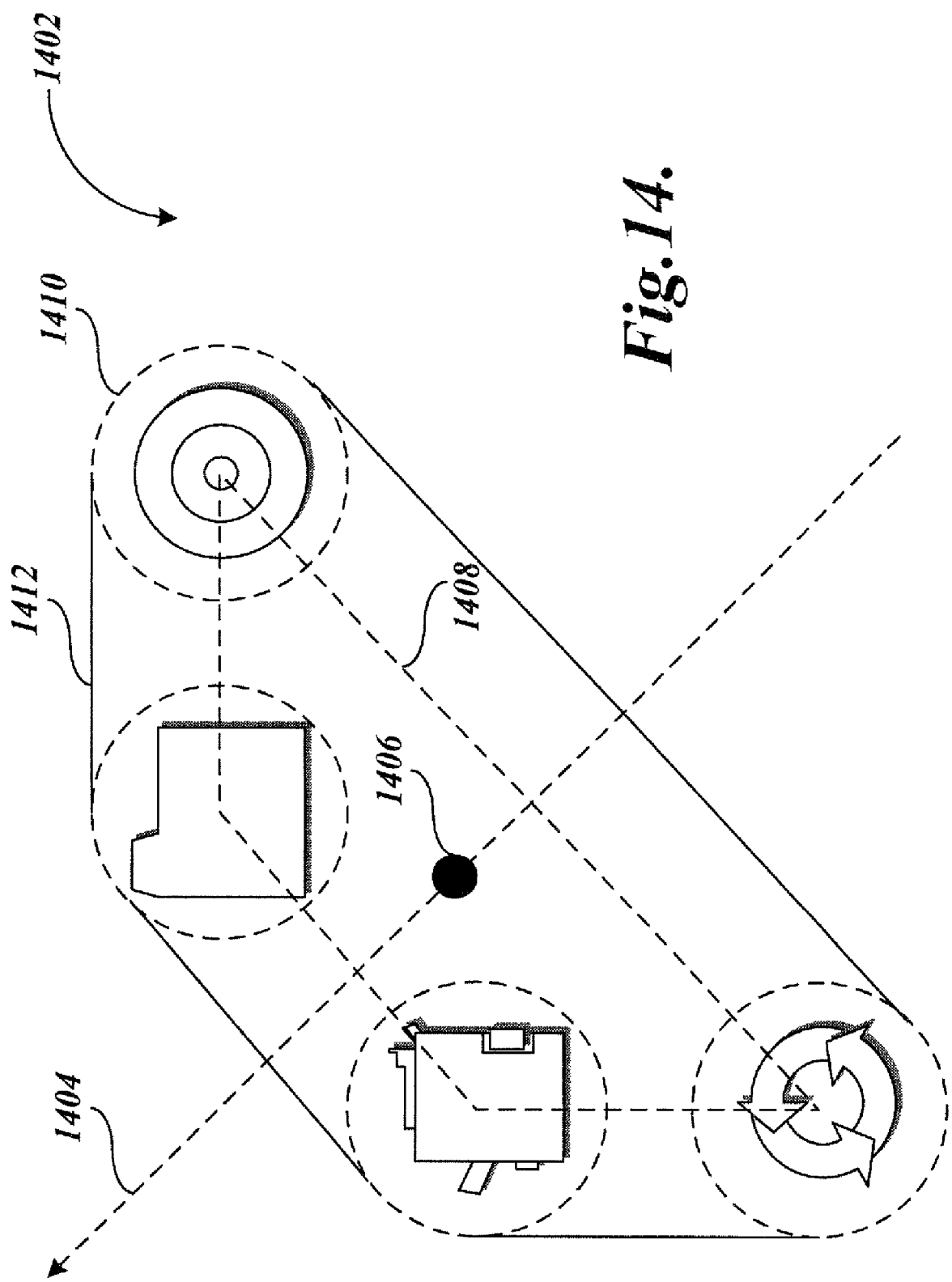
FIG. 14 is a pictorial diagram of a target cluster displayed on a display screen in proximity to the working area and generated from the target icons in the two-dimensional grid of FIG. 13B.

FIG. 14 is a pictorial diagram of a target cluster 1402 displayed on a display screen in proximity to the working area and generated from the target icons in the condensed two-dimensional grid 1302 of FIG. 13B. A center point 1406 of the target cluster is determined according to the arrangement of the target icons in the two-dimensional grid 1302. The target icons are mapped to physical locations on the display screen, thereby creating the target cluster 1402, with the target cluster's center point 1406 placed in line with the activation gesture's direction, as indicated by vector 1404. According to aspects of the present invention, the target cluster's center point 1406 is located at the center of a bounding polygon 1408 extending between the centers of the outermost target icons in the target cluster 1402.

As previously discussed, moving the activation gesture's working location away from all target icons within the target cluster is one action that dismisses the target cluster. According to one aspect of the present invention, in order to determine whether the activation gesture's working location is moved away from all target icons in the target cluster, a cluster area is determined by first generating a buffer area around each outermost target icon, such as buffer area 1410, and then encompassing the buffer areas of the outermost target icons, as indicated by cluster area 1412. Thus, according to one aspect of the invention, any movement of the activation gesture's location within the cluster area is considered to not be moving away from all target icons in the target cluster.

Figure 15A:
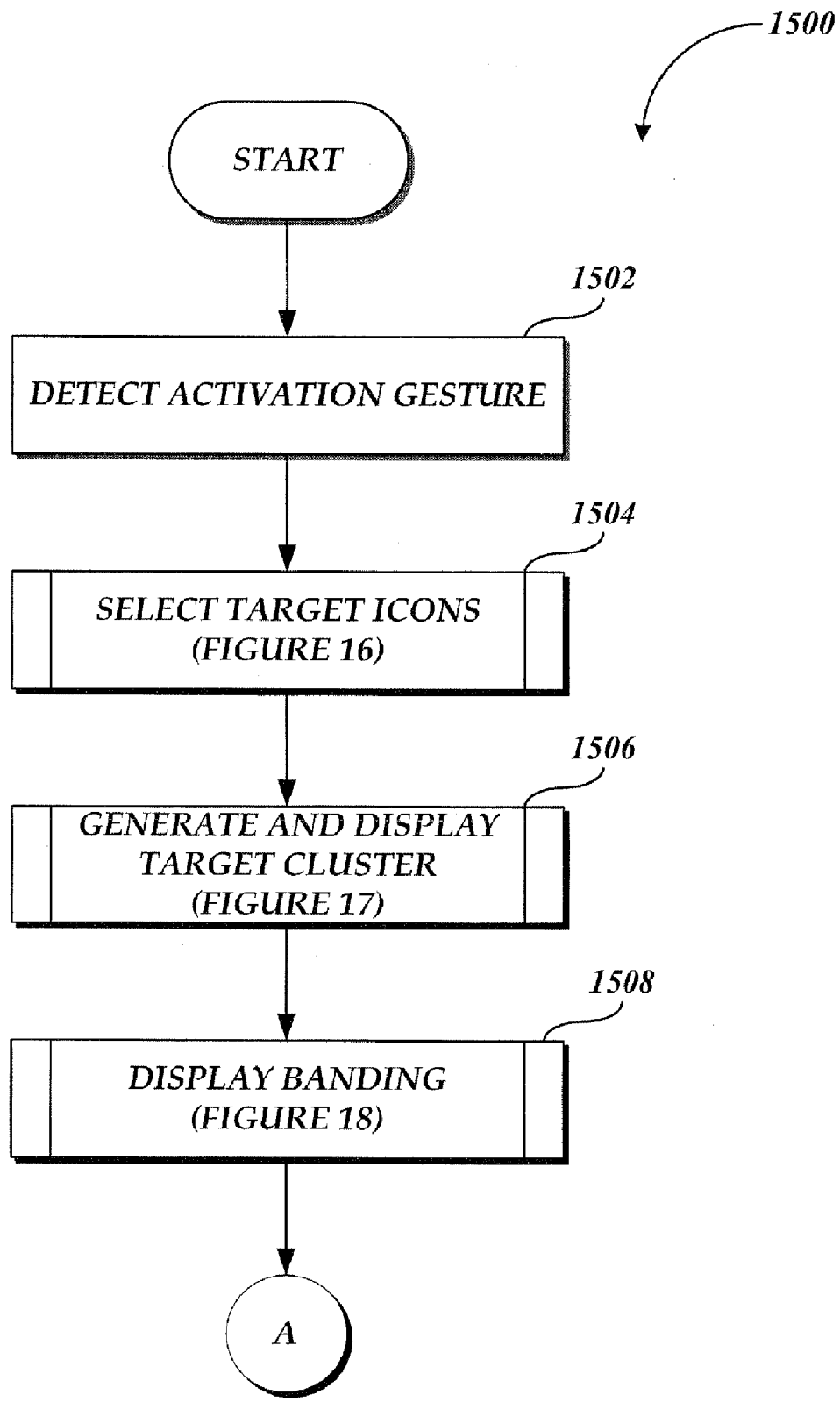
FIGS. 15A, 15B, and 15C are flow diagrams illustrative of an exemplary access remote content routine for displaying remote content in proximity to the current location in accordance with the present invention.
Figure 15B:
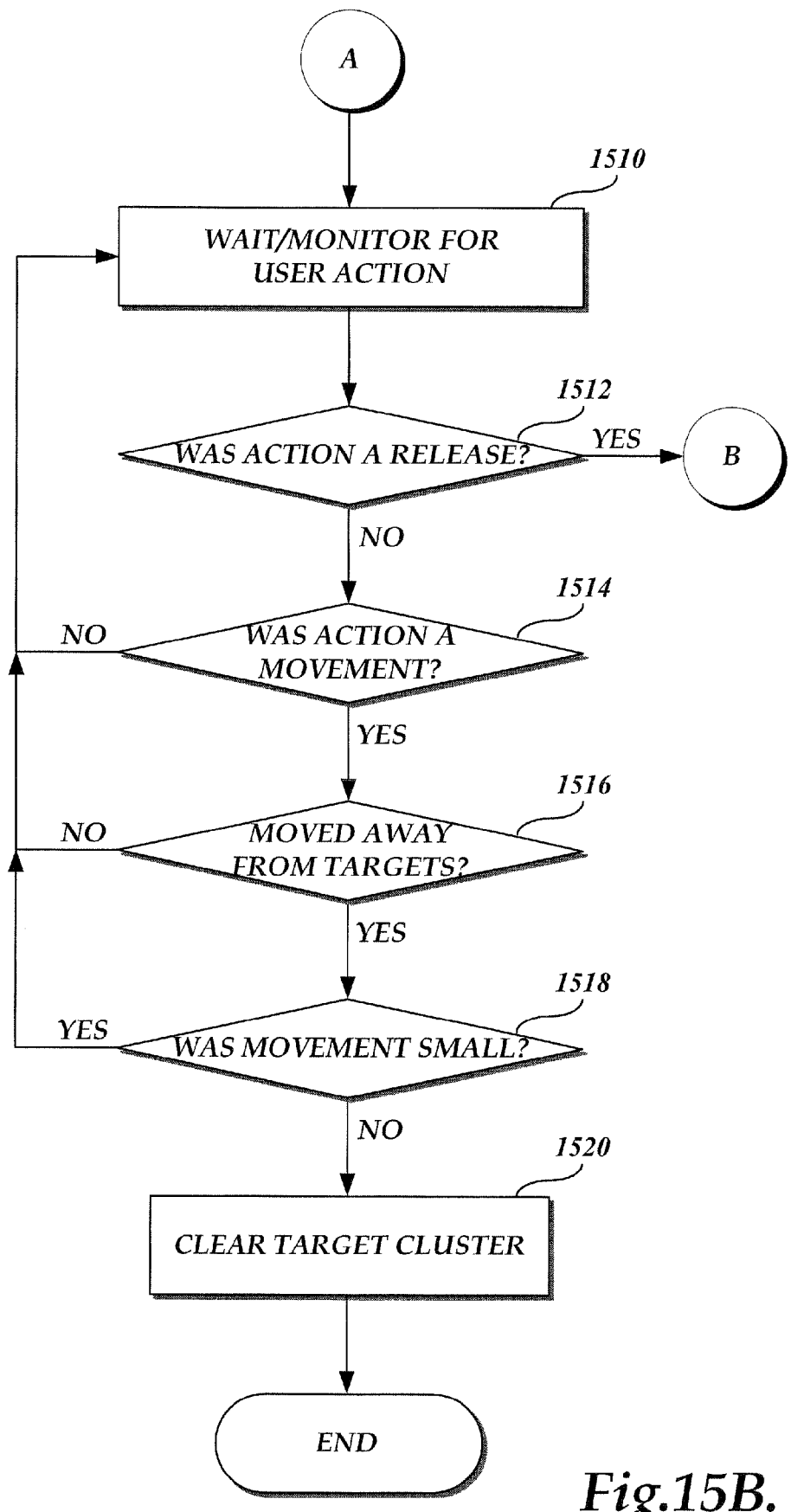
Figure 15C:
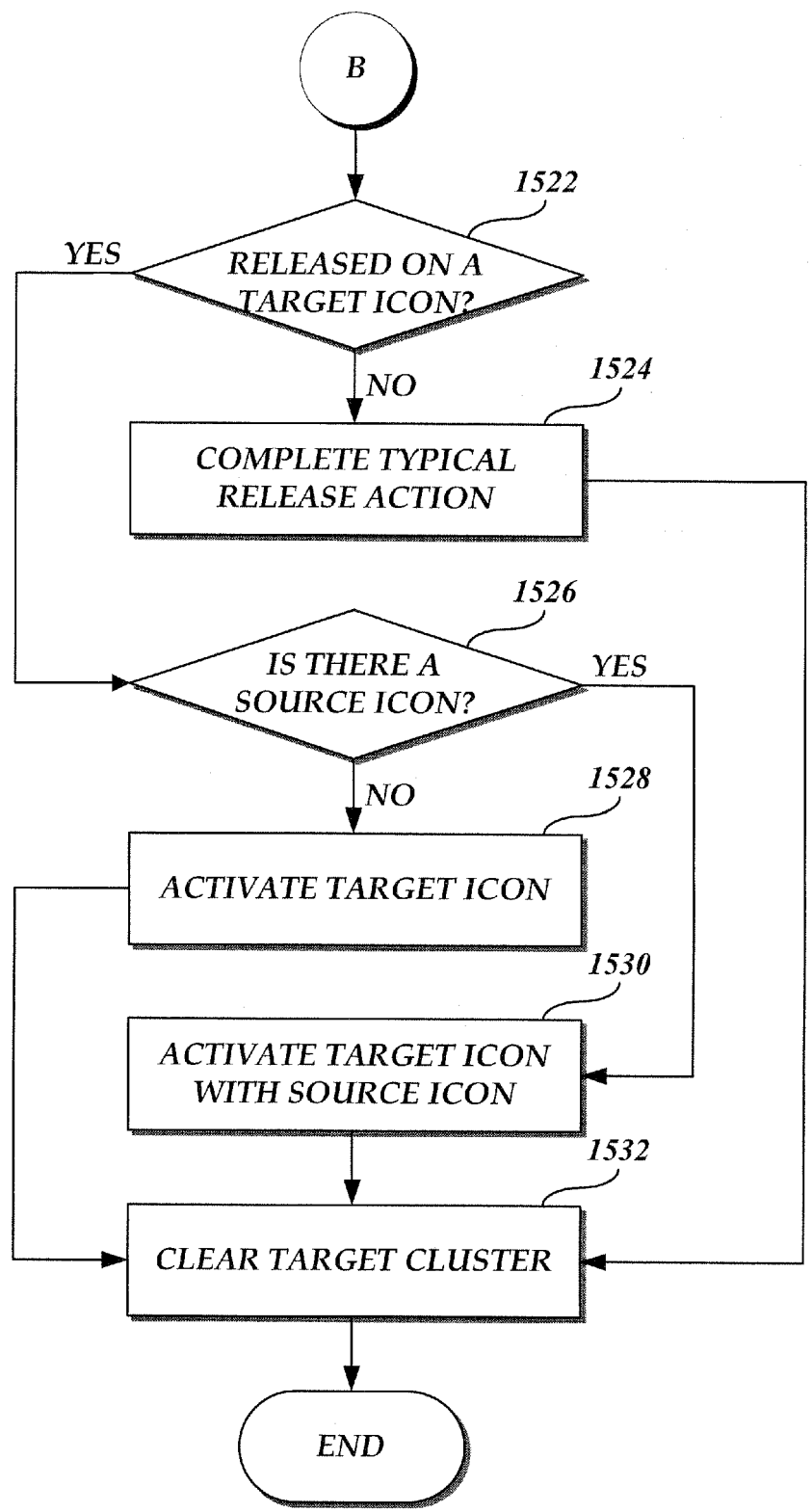

FIGS. 15A, 15B, and 15C are a flow diagram illustrating an exemplary access remote content routine 1500 suitable for accessing remote content in accordance with the present invention. Beginning at block 1502, the present invention detects an activation gesture. As previously described, an activation gesture includes dragging a source icon, or dragging on an empty area of the display screen. At block 1504, target icons to be displayed in a target cluster are selected. A more detailed description of selecting target icons for display in the target cluster is provided below in regard to FIGS. 16A and 16B.

Figure 16A:
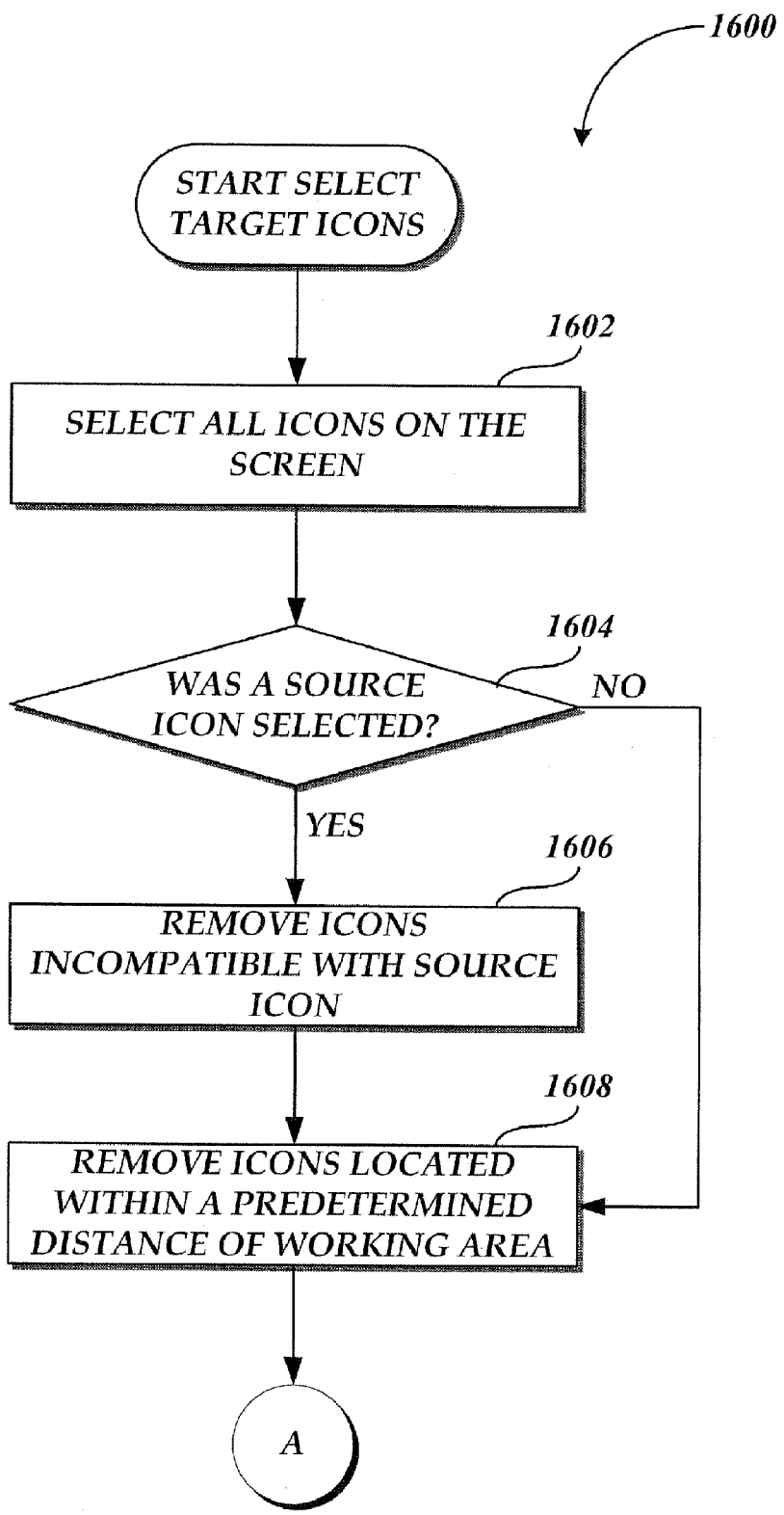
FIGS. 16A and 16B are a flow diagram illustrative of an exemplary select target icons subroutine suitable for use in the exemplary access remote content routine of FIGS. 15A, 15B, and 15C.
Figure 16B:
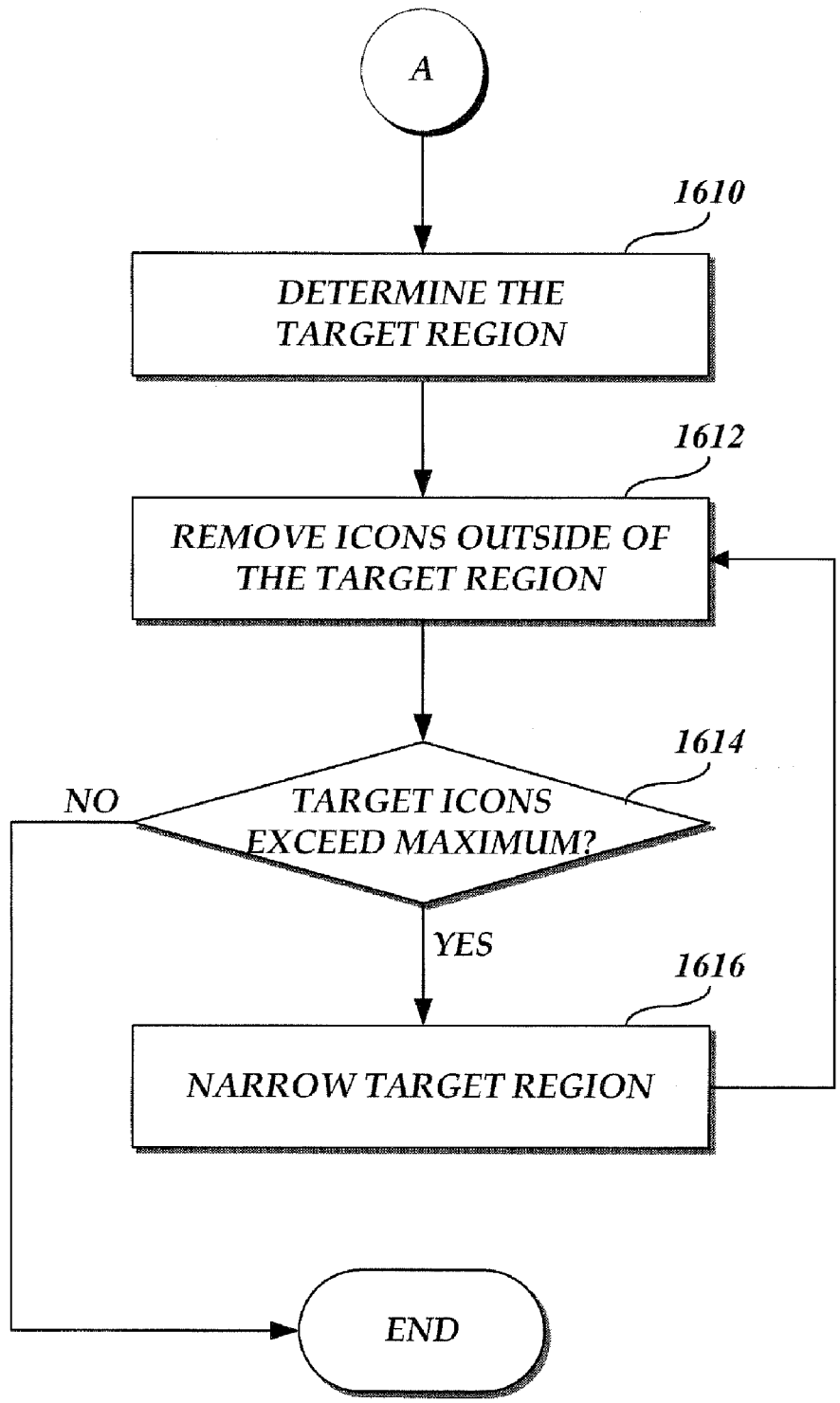

FIGS. 16A and 16B are a flow diagram illustrating an exemplary select target icons subroutine 1600 suitable for use in the exemplary access remote content routine 1500 of FIGS. 15A, 15B, and 15C. Beginning at block 1602, all icons on the display screen, or single visual display area, are initially included in a candidate set of icons. At decision block 1604, a determination is made as to whether the activating gesture's selection was a nonempty selection having a source icon. If there is a source icon, at block 1606, those icons that are incompatible with the source icon are removed from the candidate set and the exemplary subroutine 1600 proceeds to block 1608. As previously discussed, the determination of incompatible icons may be modified according to an additional user action that modifies the activation gesture. Alternatively, if, at decision block 1604, there is no source icon selected, the exemplary subroutine 1600 proceeds to block 1608.

At block 1608, those icons located within a predetermined distance from the working area are removed from the candidate set of icons. At block 1610 (FIG. 16B), a target region is determined according to the activation gesture. As previously described in regard to FIG. 6, preferably, the target region is that area on the display screen between two boundary vectors on either side of a center vector aligned with the activation gesture, and angling away from the center vector at a predetermined angle. At block 1612, those icons residing outside of the target region are removed from the candidate set of icons.

At decision block 1614, a determination is made as to whether the number of icons in the candidate set exceeds a predetermined maximum amount. If the predetermined maximum number is exceeded, at block 1616 the target region is narrowed by reducing the angle at which the bounding vectors angle away from the center vector. After narrowing the target region, returning to block 1612, those icons now located outside of the target region are removed from the candidate set. Narrowing the target region to reduce the number of icons in the candidate set is repeated until the number of icons in the set does not exceed the predetermined maximum amount. Alternatively, at decision block 1614, if the number of icons in the candidate set does not exceed the predetermined maximum amount, the remaining icons in the candidate set are selected as the target icons, and the routine 1600 terminates.

With reference to FIG. 15A, after having selected the target icons, at block 1506, the target cluster is generated and displayed in the proximity of the working location. A more detailed description of generating and displaying the target cluster is set forth in regard to FIGS. 17A and 17B.

Figure 17A:
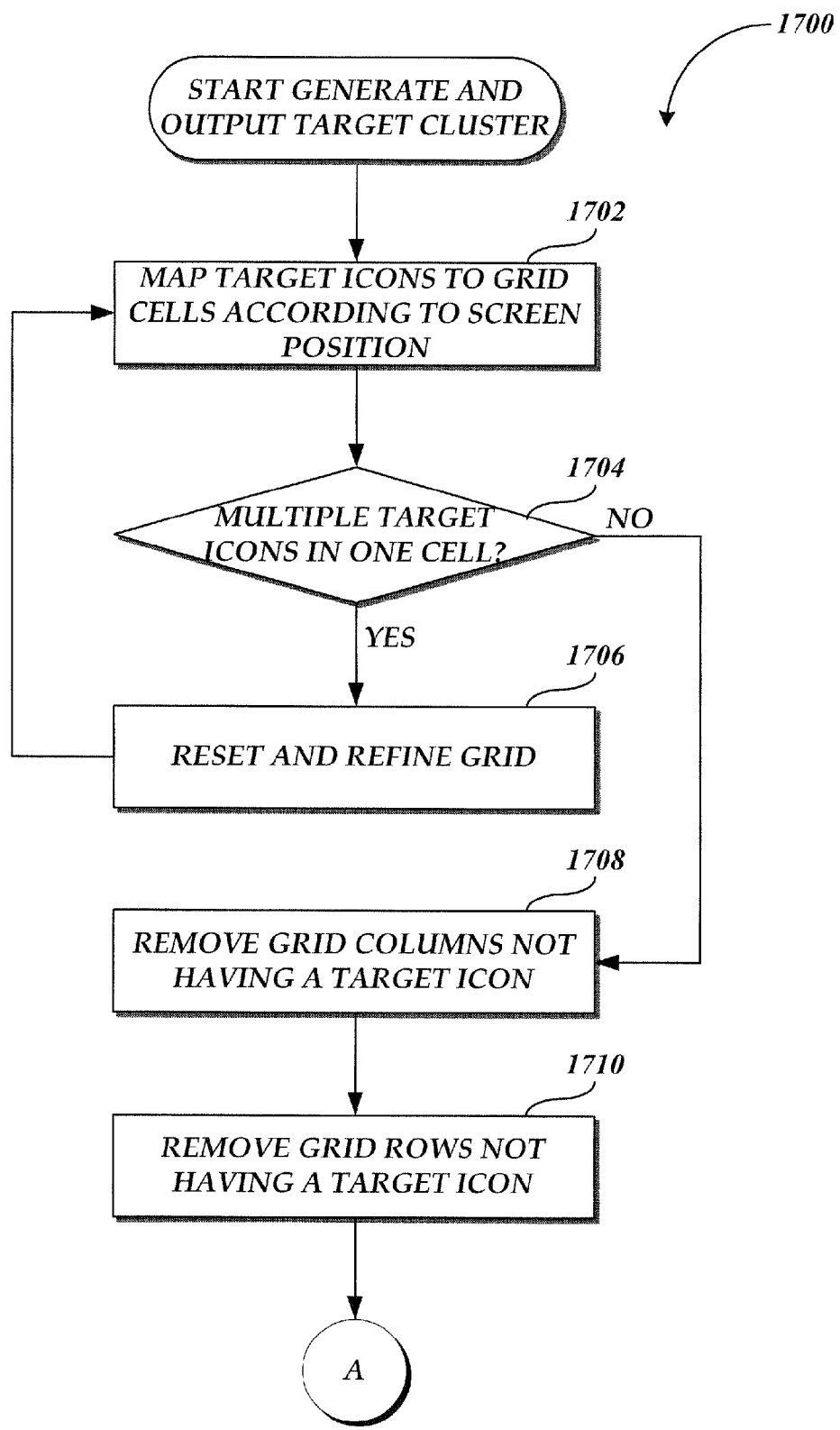
FIGS. 17A and 17B are a flow diagram illustrative of an exemplary generate and display target cluster subroutine for use in the exemplary access remote content routine of FIGS. 15A, 15B, and 15C.
Figure 17B:
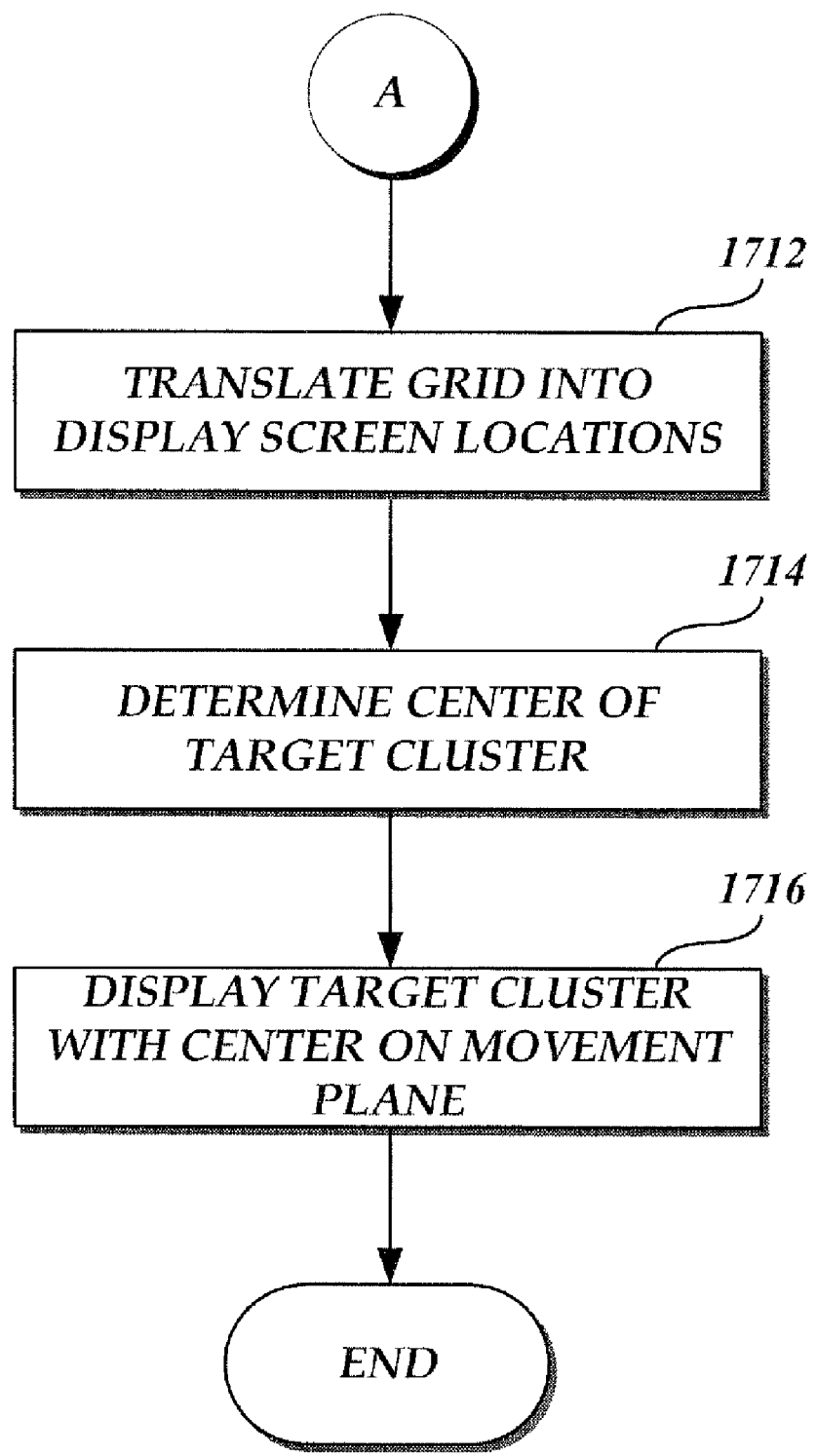

FIGS. 17A and 17B are a flow diagram illustrating an exemplary generate and display target cluster subroutine 1700 suitable for use in the exemplary access remote content routine 1500 of FIGS. 15A, 15B, and 15C. Beginning at block 1702, the target icons are mapped into cells of a two-dimensional grid according to their location on the display screen. Mapping target icons into the two-dimensional grid was previously discussed in regard to FIGS. 13A and 13B. At decision block 1704, a determination is made as to whether at least two target icons are mapped to the same grid cell. If at least one cell within the two-dimensional grid is mapped to that cell, at block 1706, the two-dimensional grid is reset and the area corresponding to each grid cell is reduced. Returning again to block 1702, the target icons are again mapped to grid cells. Resetting the two-dimensional grid and reducing the area corresponding to the grid cells continues until no cell within the grid has more than one target icon mapped to it.

Alternatively, at decision block 1704, if no cell in the two-dimensional grid has more than one target icon mapped to it, at block 1708, those columns in the two-dimensional grid not having at least one cell with a target icon are removed. At block 1710, those rows in the two-dimensional grid not having at least one cell with a target icon are removed. Alternatively (not shown), instead of removing those rows and columns not having at least one cell with a target icon, those rows and columns may be substantially narrowed or shortened when displayed in the target cluster on the display screen.

At block 1712, the two-dimensional grid is translated into physical space on the screen. While target icons will typically have a predefined size, the spacing of columns and rows may be controlled according to predetermined amounts that are user configurable. By locating rows and columns of target icons closely together, a compressed target cluster may be presented to the user, reducing the amount of movement necessary to activate any one target icon in the target cluster.

At block 1714, the center point of the target cluster is determined. As previously discussed in regard to FIGS. 13A and 13B, a polygon defining a bounding box of all the target icons is determined, and the center point of the bounding box is determined. At block 1716, the target cluster is displayed on the display screen in the proximity of the working area, with the target cluster's center point placed on the activation gesture's line of movement, and at a predetermined distance from the working area. Thereafter, the routine 1700 terminates.

With reference to FIG. 15A, at block 1508, the bands between the base and target icons in the target cluster are displayed. A more detailed description of displaying the bands between the base and target icons is described below in regard to FIG. 18.

Figure 18:
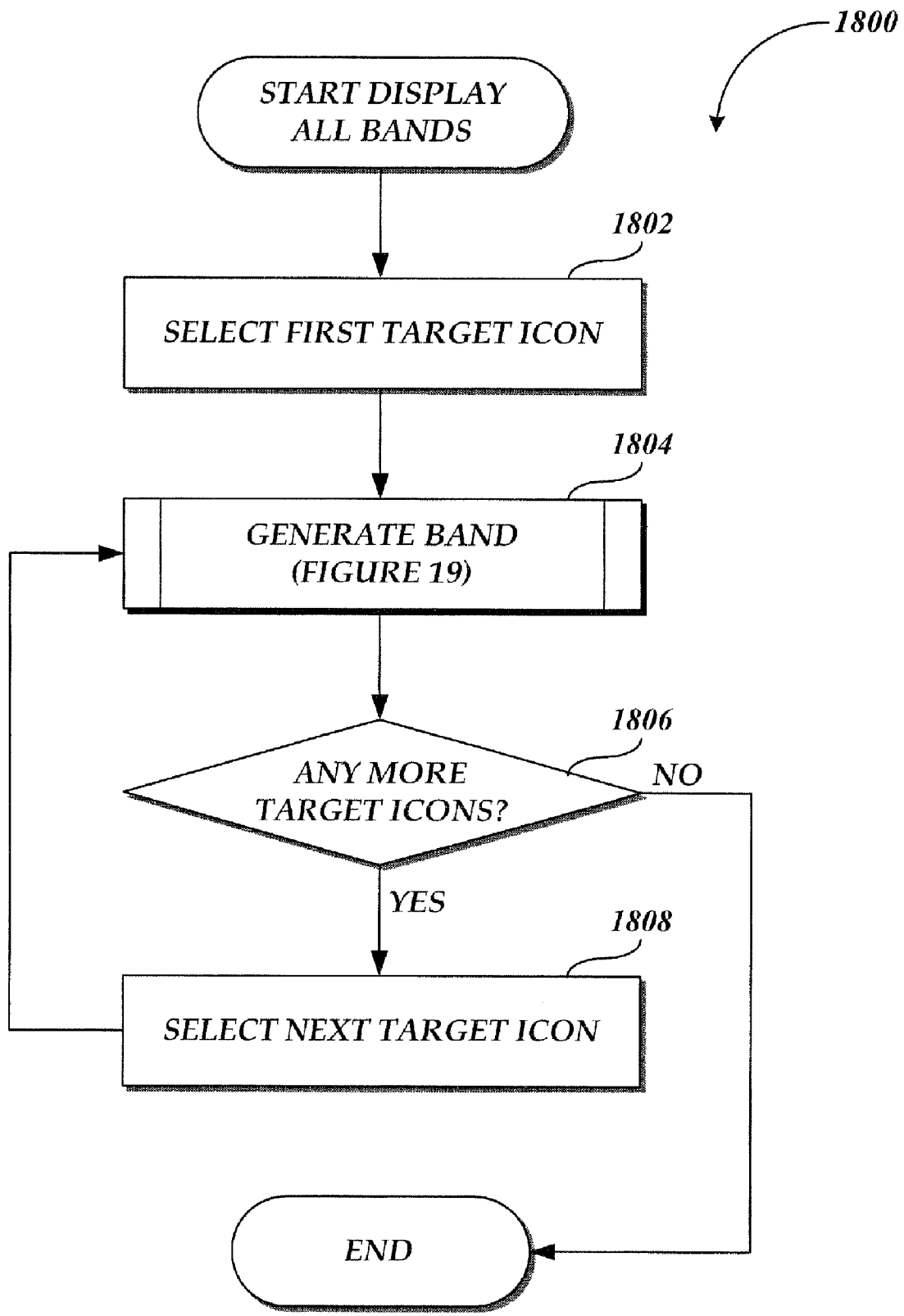
FIG. 18 is a flow diagram illustrative of an exemplary display band subroutine for use in the exemplary access remote content routine of FIGS. 15A, 15B, and 15C.

FIG. 18 is a flow diagram illustrating an exemplary display all bands subroutine 1800 suitable for use in the exemplary access remote content routine 1500 of FIGS. 15A, 15B, and 15C. At block 1802, a first target icon is selected. According to one aspect of the present invention, target icons in the target cluster are processed, for the purpose of generating and displaying the bands between the base and target icon, in a closest-first manner, meaning from those target icons nearest to the working area to those target icons farthest away from the working area. At block 1804, a band is displayed between the selected target icon and its corresponding base icon. Preferably, the type of band displayed between the base and target icons is user configurable. A more detailed description of displaying a band between a selected target icon and its corresponding base icon is presented in regard to FIG. 19.

Figure 19:
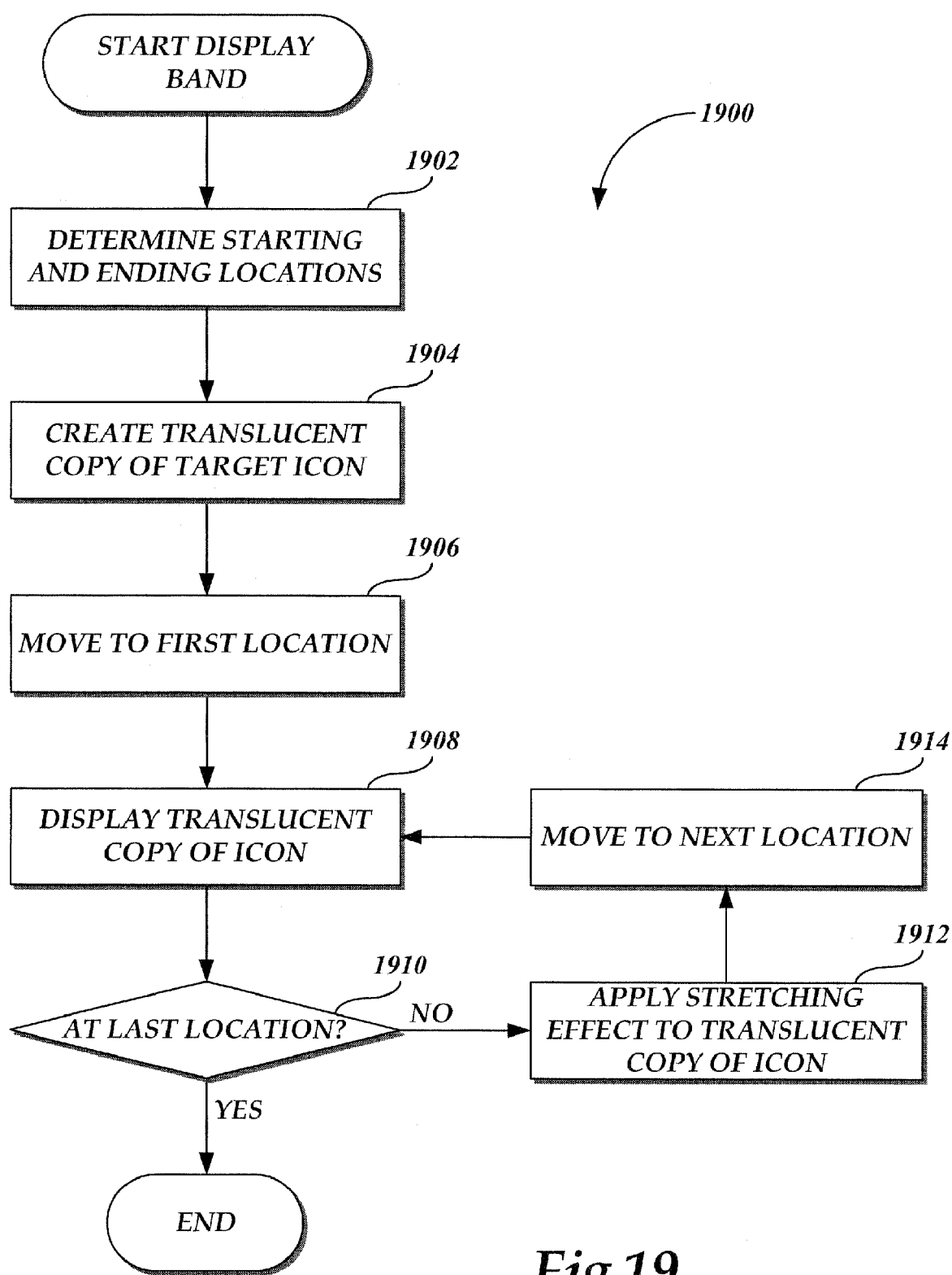
FIG. 19 is a flow diagram illustrative of an exemplary generate band subroutine suitable for use in the exemplary display band subroutine of FIG. 18.

FIG. 19 is a flow diagram illustrating an exemplary display band subroutine 1900 suitable for use in the exemplary display all bands subroutine 1800 of FIG. 18. Beginning at block 1902, the starting and ending locations for a band between a base and target icon are determined. For example, the starting location for the band may begin at the same location as the base icon and end at the location of the target icon. At block 1904, a translucent copy of the target icon is created.

At block 1906, the exemplary routine 1900 moves to the first location for displaying the band between the base and target icon. According to aspects of the present invention, movement between the base icon and the target icon is in a direct line between the two icons. Additionally, movements are made in predetermined increments. For example, a movement may be a single pixel from the base icon toward the ending location at or near the target icon.

At block 1908, the translucent icon is displayed at the current location. At decision block 1910, a determination is made as to whether the translucent copy was displayed at the ending location. If, at decision block 1910, the translucent copy was displayed at the ending location, the exemplary subroutine 1900 terminates. Alternatively, if the translucent copy was not displayed at the ending location, at block 1912, a stretching effect is applied to the translucent copy. According to one aspect of the present invention, to apply the stretching effect, the size of the translucent copy is adjusted according to the current distance from the midpoint between the base and target icons. As the movements approach the midpoint, the size of the translucent copy is reduced by a predetermined amount. As the movements move away from the midpoint, the size of the translucent copy is increased by the predetermined amount.

At block 1914, the location for displaying the translucent copy of the target icon is moved toward the ending location. The process again returns to block 1908 where the translucent copy is displayed at its next location. This process of displaying the translucent copy, applying the stretching effect, and moving to the next location, repeats until the ending location is reached.

With reference to FIG. 18, at decision block 1806, a determination is made as to whether there are any more target icons to be selected for displaying the band between the target icon and its base icon. If there are more target icons to be selected, at block 1808, the next target icon is selected, and the subroutine 1800 returns to block 1804. Alternatively, if, at decision block 1806 there are no remaining target icons to select, the exemplary subroutine 1800 terminates.

With reference to FIG. 15B, at block 1510, the exemplary routine 1500 monitors for a user action. After detecting a user action, at block 1512, a determination is made as to whether the user action was a release. As previously discussed, a release will typically be a drop action, whether the activation gesture's selection is empty or nonempty. If the user action was not a release, at block 1514, a determination is made as to whether the user action was a movement. If the user action was not a movement, the process returns to block 1510 where it waits for and monitors for additional user action. It should be understood that, while not shown, other processing of the action may occur that is not identified in this exemplary routine. For example, the user's action may be passed on to the operating system for typical processing. Accordingly, the exemplary process is for illustration purposes only, and should not be construed as limiting upon the present invention.

Alternatively, at decision block 1514, if the user's action was a movement, at decision block 1516, a determination is made as to whether the movement was in a direction away from all of the target icons in the target cluster. If the movement was not in a direction away from all of the target icons, the process returns to block 1510 where it again waits for and monitors for additional user actions. Alternatively, at block 1516, if the movement was in a direction away from all of the target icons, at decision block 1518, a further determination is made as to whether the movement was slight. By ignoring slight backward drift, the present invention can be tolerant of common human jitters or drift. According to aspects of the invention, a movement is slight if the amount of movement is less than a predetermined tolerance amount. According to further aspects of the invention, the predetermined tolerance amount is user configurable. For example, the predetermined tolerance amount may be set such that a movement of less than 5 pixels in a direction away from any target icon is tolerated.

At decision block 1518, if the movement was slight, the process returns to block 1510 to wait for and monitor for further user action. Alternatively, at decision block 1518, if the movement was not slight, as described above, at block 1520, the target cluster is dismissed and the routine terminates.

Alternatively, at decision block 1512, if the user's action was a release, at decision block 1522, a determination is made as to whether the release was located on a target icon. If the release was located on a target icon, at decision block 1526, determination is made as to whether the activation gesture's selection was a nonempty selection having a source icon. If the activation gesture's selection includes a source icon, at block 1530, the content associated with the target icon upon which the release was made is activated with the source icon. Thereafter, at block 1532, the target cluster is dismissed, including the bands, and the exemplary routine 1500 terminates.

Alternatively, at decision block 1526, if the activation gesture's selection was empty, at block 1528, the content associated with the target icon is activated. At block 1532, the target cluster is dismissed, and the exemplary routine 1500 terminates.

At decision block 1522, if the release was not located on a target icon, at block 1524, the release action is completed in accordance with the typical operation of the computing system. For example, if a source icon was dragged and dropped, but not on a target icon, the source icon would be moved to the new location as is typical with a drag-and-drop operation. After completing the typical release action, at block 1532, the target cluster is dismissed, and the exemplary routine 1500 terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for facilitating user access to remote icons on a display screen, the method comprising:
   detecting an activation gesture, the activation gesture including a location;
   selecting at least one base icon on the display screen located at a distance greater than a predetermined distance from the activation gesture's location;
   generating a target icon for each selected base icon; and
   displaying the target icons in proximity to the activation gesture's location until an action dismissing the target icons is detected, wherein displaying the target icons in proximity to the activation gesture's location until the action dismissing the target icons is detected comprises displaying the target icons and the base icons simultaneously on the display screen until the action dismissing the target icons is detected.

2. The method of claim 1, wherein the activation gesture further includes an origin and a direction, and wherein selecting at least one base icon on the display screen located at a distance greater than the predetermined distance from the activation gesture's location comprises:
   determining a vector originating at the activation gesture's origin and extending to limits of the display screen along the activation gesture's direction;
   determining a target region defined by two boundary lines originating at the activation gesture's origin and diverging away from and on either side of the vector and extending to the limits of the display screen; and
   selecting the base icons from only those icons located within the target region.

3. The method of claim 1, wherein the activation gesture further includes a selection, and wherein selecting at least one base icon on the display screen located at a distance greater than the predetermined distance from the activation gesture's location comprises:
   determining whether the activation gesture's selection includes a source icon and, if so, selecting the at least one base icon on the display screen located at a distance greater than the predetermined distance from the activation gesture's location and representing content compatible with the source icon.

4. The method of claim 3, further comprising:
   determining whether the action dismissing the target icons is made on a particular target icon, and if so, activating content associated with the particular target icon on which the action dismissing the target icons is made with contents of the activation gesture's selection.

5. The method of claim 1, further comprising displaying a connection between each target icon and a corresponding base icon.

6. The method of claim 5, wherein displaying a connection comprises displaying a band between each target icon in a target cluster and a corresponding base icon, and wherein the band displayed between each target icon and a corresponding base icon narrows as the band approaches a midpoint between the target icon and its corresponding base icon.

7. A method for accessing remotely located icons on a display screen, comprising:
   detecting an activation gesture, the activation gesture including a location and a selection;
   selecting at least one base icon remotely located on the display screen, wherein selecting the at least one base icon remotely located on the display screen comprises determining whether the activation gesture's selection includes a source icon and, if so, selecting at least one base icon remotely located on the display screen representing content compatible with the source icon;
   generating a target icon for each selected base icon; and
   displaying the target icons in proximity to the activation gesture's location simultaneously with the selected at least one base icon until an action dismissing the target icons is detected.

8. The method of claim 7, wherein selecting at least one base icon remotely located on the display screen comprises selecting the at least one base icon located on the display screen at a distance greater than a predetermined distance from the activation gesture's location.

9. The method of claim 7, wherein the activation gesture further includes an origin and a direction, and wherein selecting the at least one base icon remotely located on the display screen comprises:
   determining a vector originating at the activation gesture's origin and extending to limits of the display screen along the activation gesture's direction;
   determining a target region defined by two boundary lines originating at the activation gesture's origin and diverging away from and on either side of the vector and extending to the limits of the display screen; and
   selecting base icons from only those icons located within the target region.

10. The method of claim 7, further comprising:
    determining whether the action dismissing the target icons is made on a particular target icon and, if so, activating content associated with the particular target icon on which the action dismissing the target icons is made with contents of the activation gesture's selection.

11. The method of claim 7, further comprising displaying a band between each target icon and a corresponding base icon, wherein the band displayed between each target icon and a corresponding base icon narrows as the band approaches a midpoint between the target icon and its corresponding base icon.

12. A computer system for facilitating user access to remote icons on a display device, the system comprising:
    the display device capable of displaying a plurality of icons;
    a user input device for interfacing with and interacting with a user; and
    a computing device, communicatively coupled to the display device and to the user input device, and configured to:
       output the plurality of icons for display on the display device;
       detect an activation gesture including a location; and
       upon detecting the activation gesture:
          select at least one base icon on the display screen located at a distance greater than a predetermined distance from the activation gesture's location;
          generate a target icon for each selected base icon;
          output the target icons in proximity to the activation gesture's location to the display device until an action dismissing the target icons is detected; and
          output for display to the display device a connection between each target icon and a corresponding base icon.

13. The computer system of claim 12, wherein the activation gesture further includes an origin and a direction, and wherein selecting the at least one base icon on the display screen located at a distance greater than the predetermined distance from the activation gesture's location comprises:

determining a vector originating at the activation gesture's origin and extending to limits of the display screen along the activation gesture's direction;

determining a target region defined by two boundary lines originating at the activation gesture's origin and diverging away from and on either side of the vector and extending to the limits of the display screen; and selecting base icons from only those icons located within the target region.

14. The computer system of claim 13, wherein the activation gesture further includes a selection, and wherein selecting the at least one base icon on the display screen located at a distance greater than the predetermined distance from the activation gesture's location comprises:

determining whether the activation gesture's selection includes a source icon and, if so, selecting the at least one base icon on the display screen located at a distance greater than the predetermined distance from the activation gesture's location and representing content compatible with the source icon.

15. The computer system of claim 14, wherein the computing device is further configured to:

determine whether the action dismissing the target icons is made on a particular target icon and, if so, activate content associated with the particular target icon on which the action dismissing the target icons is made with contents of the activation gesture's selection.

16. The computer system of claim 12, wherein displaying the target icons in proximity to the activation gesture's location until the action dismissing the target icons is detected comprises displaying the target icons and the base icons simultaneously on the display screen until the action dismissing the target icons is detected.

17. The computer system of claim 12, wherein outputting for display to the display device a connection between each target icon and a corresponding base icon comprises displaying a band between each target icon in a target cluster and a corresponding base icon, and wherein the band displayed between each target icon and a corresponding base icon narrows as the band approaches a midpoint between the target icon and its corresponding base icon.

* * * * *